United States Patent
Rekimoto

(10) Patent No.: US 8,345,881 B2
(45) Date of Patent: Jan. 1, 2013

(54) COMMUNICATION SYSTEM, INFORMATION PROCESSING APPARATUS, METHOD AND COMPUTER PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 491 days.

(21) Appl. No.: 10/976,272

(22) Filed: Oct. 28, 2004

(65) Prior Publication Data
US 2005/0117750 A1   Jun. 2, 2005

(30) Foreign Application Priority Data
Oct. 31, 2003  (JP) ................................. 2003-373312

(51) Int. Cl.
H04L 9/08   (2006.01)
(52) U.S. Cl. ............................. 380/282; 713/171; 709/220
(58) Field of Classification Search ................ 380/282; 709/220, 222, 225; 713/171
See application file for complete search history.

(56) References Cited

U.S. PATENT DOCUMENTS

| | | | |
|---|---|---|---|
| 5,175,418 A | 12/1992 | Tanaka | |
| 6,068,193 A | 5/2000 | Kreft | |
| 7,042,852 B2 * | 5/2006 | Hrastar | 370/310 |
| 7,096,359 B2 * | 8/2006 | Agrawal et al. | 713/168 |
| 7,127,210 B2 * | 10/2006 | Aoyagi | 455/41.2 |
| 7,155,167 B1 * | 12/2006 | Carty | 455/67.11 |
| 7,325,246 B1 | 1/2008 | Halasz et al. | |
| 7,359,674 B2 | 4/2008 | Markki et al. | |
| 7,474,425 B2 | 1/2009 | Sasama | |
| 2001/0023446 A1 | 9/2001 | Balogh | |
| 2001/0025878 A1 | 10/2001 | Hendrick | |
| 2003/0018889 A1 | 1/2003 | Burnett et al. | |

(Continued)

FOREIGN PATENT DOCUMENTS

EP   0957651   11/1999

(Continued)

OTHER PUBLICATIONS

J. Edney et al. "Real 802.11 Security: Wi-Fi Protected Access and 802.11i" Published Jul. 15, 2003 by Addison Wesley Professional. Excerpts from Chapters 5, 7-9, and 13.*

(Continued)

*Primary Examiner* — Kim Vu
*Assistant Examiner* — Thomas Gyorfi
(74) *Attorney, Agent, or Firm* — Robert J. Depke; Rockey, Depke & Lyons, LLC

(57) ABSTRACT

The present invention aims at granting easy and prompt start of wireless communications in which security is ensured without incurring addition of hardware. If a connection button provided on a surface of a PDA 1 is operated, a connection request is broadcast from the PDA 1. If the PDA 1 and a portable phone 2 are in proximity to each other, and a reception intensity of the connection request from the PDA 1 is equal to or higher than a threshold value, a request of the PDA 1 is granted by the portable phone 2. Then, an encryption key is newly generated by the portable phone 2, and is transmitted to the PDA 1 together with a communication parameter. An encryption key and the communication parameter transmitted from the portable phone 2 are acquired. Encrypted communications using the encryption key generated by the portable phone 2 are established with the portable phones 2 based on the communication parameter. The present invention is applicable to information processing apparatuses, such as the PDA and the portable phone or a notebook personal computer.

11 Claims, 16 Drawing Sheets

U.S. PATENT DOCUMENTS

| | | | | |
|---|---|---|---|---|
| 2003/0054846 A1* | 3/2003 | Parry | | 455/517 |
| 2003/0087629 A1 | 5/2003 | Juitt et al. | | |
| 2003/0092395 A1 | 5/2003 | Gassho et al. | | |
| 2003/0217289 A1* | 11/2003 | Ammon et al. | | 713/201 |
| 2003/0224797 A1* | 12/2003 | Kuan et al. | | 455/446 |
| 2003/0233567 A1* | 12/2003 | Lynn et al. | | 713/200 |
| 2004/0008652 A1* | 1/2004 | Tanzella et al. | | 370/338 |
| 2004/0031856 A1 | 2/2004 | Atsmon et al. | | |
| 2004/0083362 A1 | 4/2004 | Park et al. | | |
| 2004/0111494 A1 | 6/2004 | Kostic et al. | | |
| 2004/0236860 A1 | 11/2004 | Logston et al. | | |
| 2004/0252837 A1* | 12/2004 | Harvey et al. | | 380/270 |
| 2004/0253944 A1 | 12/2004 | Kelley | | |
| 2005/0071711 A1 | 3/2005 | Shaw | | |
| 2005/0097595 A1 | 5/2005 | Lipsanen et al. | | |
| 2005/0160138 A1 | 7/2005 | Ishidoshiro | | |
| 2005/0243129 A1 | 11/2005 | Kim | | |
| 2005/0286478 A1 | 12/2005 | Mela et al. | | |

FOREIGN PATENT DOCUMENTS

| | | |
|---|---|---|
| JP | 02-280292 | 11/1990 |
| JP | 10-093508 | 4/1998 |
| JP | 2001-111543 | 4/2001 |
| JP | 2001-156704 | 6/2001 |
| JP | 2001-189722 | 7/2001 |
| JP | 2002-124960 | 4/2002 |
| JP | 2002-204239 | 7/2002 |
| JP | 2002-351766 | 12/2002 |
| JP | 2002-359623 | 12/2002 |
| JP | 2003-152735 | 5/2003 |
| JP | 2003-229872 | 8/2003 |
| JP | 2004-032462 | 1/2004 |
| JP | 2004-364199 | 12/2004 |
| JP | 2005-167946 | 6/2005 |

OTHER PUBLICATIONS

T. Dierks et al. RFC2246: The TLS Protocol Version 1.0 Published Jan. 1999 (80 pages) http://www.ietf.org/rfc/rfc2246?number=2246.*

L. Blunk et al. RFC2284: PPP Extensible Authentication Protocol (EAP). Published Mar. 1998 (15 pages) http://www.ietf.org/rfc/rfc2284?number=2284.*

C. Rigney et al. RFC2865: Remote Authentication Dlal In User Service (RADIUS) Published Jun. 2000 (76 pages) http://www.ietf.org/rfc/rfc2865?number=2865.*

Schneier, Bruce. "Applied Cryptography, $2^{nd}$ Edition" © 1996 Bruce Schneier. Published by John Wiley and Sons, Inc. (pp. 32 and 33).*

Cam-Winget, Nancy et al. "Security Flaws in 802.11 data link protocols" Communications of the ACM, vol. 46, Issue 5 (May 2003). pp. 35-39.*

Scott R. Fluhrer, Itsik Mantin, Adi Shamir, Weaknesses in the Key Scheduling Algorithm of RC4, Revised Papers from the 8th Annual International Workshop on Selected Areas in Cryptography, p. 1-23, Aug. 16-17, 2001.*

"Netgear Wireless Products FAQ" Version 1.1 Published Dec. 20, 2001 (6 pages) http://www.fulton.net.au/wirelessfaq.htm.*

Heltzel, Paul. Complete Home Wireless Networking: Windows XP Edition. Excerpt from Chapter 3 published Jun. 12, 2003 (8 pages).*

Man page for hosts_access(5), originally released as part of the FreeBSD version 3.2 published May 1999. http://www.freebsd.org/cgi/man.cgi?query=hosts_access&apropos=0&sektion=5&manpath=FreeBSD+3.2-RELEASE&format=html.*

"FreeBSD 3.2 Announcement" published May 17, 1999 http://www.freebsd.org/releases/3.2R/announce.html.*

"FreeBSD 3.2 Release Notes" published May 1999 http://www.freebsd.org/releases/3.2R/notes.html.*

"Slashdot: How Stable is WEP?" excerpts from the web page posted between Apr. 9, 2003 and Apr. 11, 2003 http://ask.slashdot.org/article.pl?sid=03/04/09/2141203.*

"IT & Security Portal: Wireless Security & Hacking" Published Aug. 5, 2002 (7 pages) http://www.it-observer.com/wireless-security-hacking.html.*

Adam Engst et al. "The Wireless Networking Starter Kit" © Peachpit Press. Excerpts from Chapters 4 & 5 (103 pages).*

Paul Hertzel. "Complete Home Wireless Networking: Windows® XP Edition" Published Jun. 12, 2003 by Prentice Hall Inc. Excerpt from Chapter 3 (4 pages).*

Jin Geier. "Understanding Ad Hoc Mode" Published Aug. 23, 2002 by wi.fiplanet.com (2 pages) http://www.wi-fiplanet.com/tutorials/article.php/1451421.*

Lidong Zhou et al. "Securing Ad Hoc Networks" Published in IEEE Network, vol. 13, Issue 6 (Nov./Dec. 1999) (pp. 24-30).*

* cited by examiner

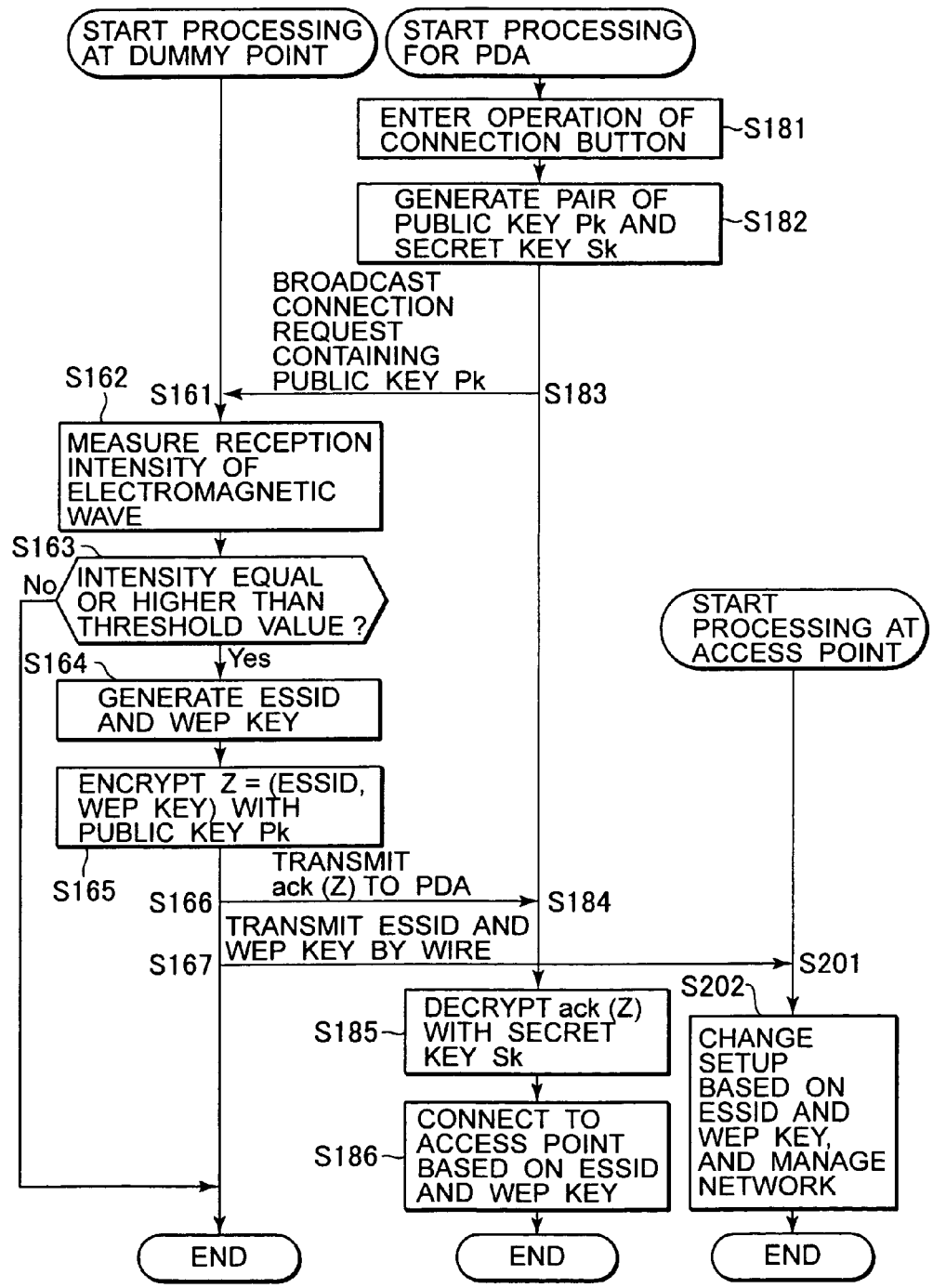

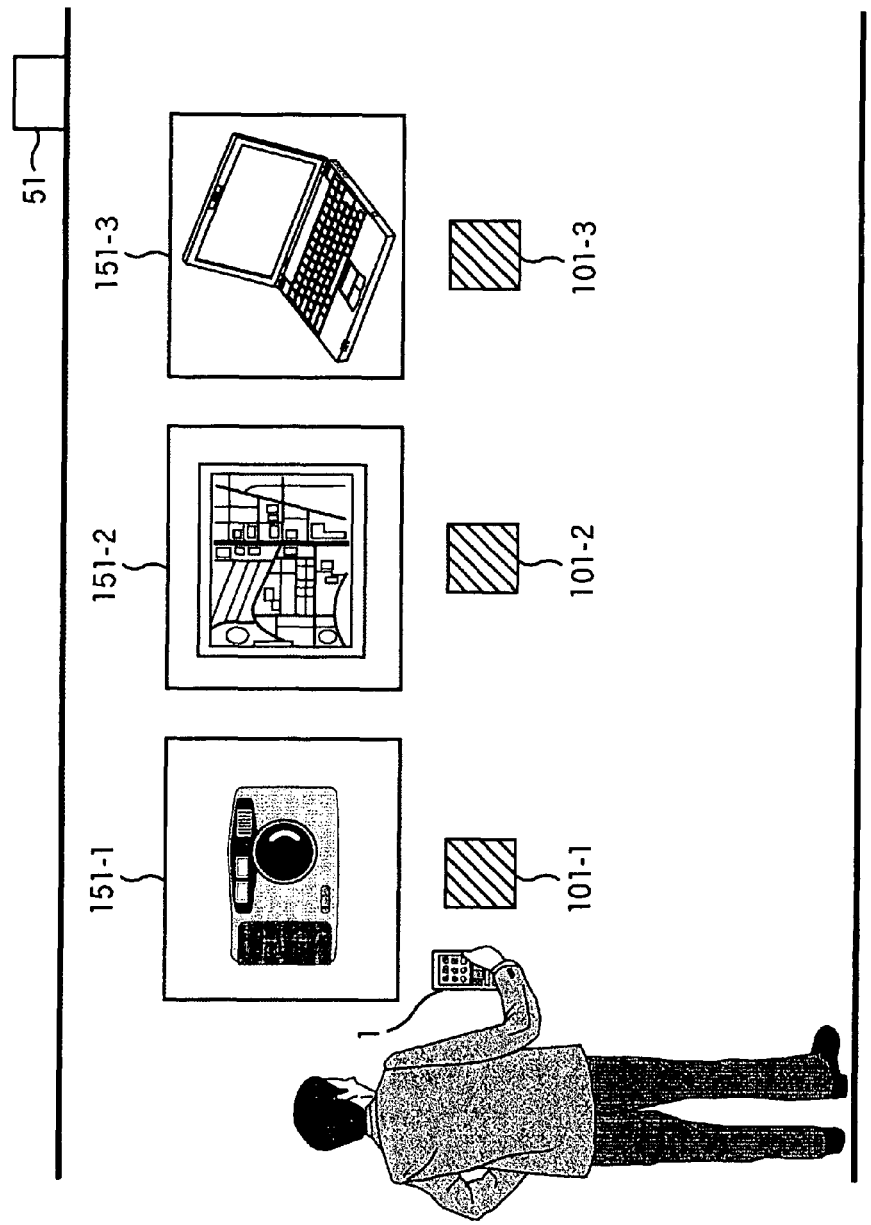

COMMUNICATION SYSTEM, INFORMATION PROCESSING APPARATUS, METHOD AND COMPUTER PROGRAM

CROSS REFERENCES TO RELATED APPLICATIONS

The present document is based on Japanese Priority Document JP2003-373312, filed in the Japanese Patent Office on Oct. 31, 2003, the entire contents of which being incorporated herein by reference to the extent granted by law.

BACKGROUND OF THE INVENTION

1. Field of the Invention

The present invention relates to a communication system, information processing apparatus and method, and a computer program, and particularly to a communication system, information processing apparatus and method, and a computer program capable of easily and promptly starting wireless communications in which security is ensured without additional hardware.

2. Related Art

In recent years, electronics devices equipped with a wireless communication function typically in accordance with the IEEE (Institute of Electrical and Electronics Engineers) 802.11 communications standard and the Bluetooth (Bluetooth (registered trademark)) communications standard have been widely used.

Information which needs to be kept confidential, such as information relating with privacy etc., is also transmitted and received between apparatuses having the above-mentioned wireless communication function, so that there is a need for security countermeasures to prevent a third party from intercepting, falsifying such information and carrying out unauthorized network access.

For example, in the IEEE 802.11 communications standard, a user registers beforehand a secret key called a WEP (Wired Equivalent Privacy) key with a device for communicating, and performs encrypted communications by using the WEP key, to thereby secure safety of the communications. Further, a digital certificate is issued beforehand so as to authenticate a device of a communication counterpart by using the certificate at the time of starting communications, to thereby determine whether it is a right communication counterpart or not, and secure safety.

By the way, if registration of information on such a key and issue of the certificate are always performed beforehand in order to secure safety, it is not possible to promptly respond to switching of connection parties of wireless communications. It is not possible to promptly respond to temporary connections, such as for example, connecting two portable devices temporarily by radio so as to transmit a certain file, connecting a digital camera temporarily by radio with a printer installed in a store so as to print imaged photographs, connecting a video camera with a portable phone temporarily by radio so as to remotely control the video camera by using the portable phone, etc.

Then, in order to specify a connection party easily, and to promptly start wireless communications with a specified device, Japanese Laid-Open Patent Application No 2002-204239, for example, discloses that a portable phone having a built-in RF tag is brought into proximity with a personal computer having a built-in reader/writer, so that identification information data of both devices are transmitted and received between the RF tag and the reader/writer. Then, the Bluetooth communications are established between the portable phone and the personal computer, based on the transmitted and received identification information data.

Further, it has been proposed conventionally that a secret key is shared between two devices in short distance wireless communications by means of the RF tag and the reader/writer or in short distance wireless communications by means of infrared modules provided in both the devices. Therefore, for example, the Bluetooth communications established in such a way as to be disclosed in Patent Document 1 are encrypted by using the secret key which is transmitted and received in the short distance wireless communications, so that the user may only bring both the devices into proximity with each other so as to promptly start the Bluetooth communications in which the security is ensured.

SUMMARY OF THE INVENTION

However, as described above, in order to transmit and receive the identification information data and the secret key between both the devices, it is necessary for both the devices to be provided with short distance wireless communication modules, such as the RF tag, the reader/writer, or the infrared module, in addition to the wireless communication module, such as the Bluetooth communications etc., which can perform communications even in a relatively distant position.

Therefore, although the RF tag, the infrared module, etc. are only for establishing the Bluetooth communications etc. by means of the wireless communication module provided in addition to them, it is necessary to prepare them for causing the Bluetooth communication etc. to start promptly only by bringing the devices into proximity to each other, which increases the cost accordingly.

The present invention has been conceived in view of a situation as described above, and aims to granting easy and prompt start of the wireless communications in which security is ensured without additional hardware, such as the RF tag and the infrared module.

A first information processing apparatus of a communication system in accordance with the present invention includes: a first transmission means or transmitter for wirelessly broadcasting a connection request containing a public key; a first reception means or receptor for receiving a key information which is transmitted wirelessly from a second information processing apparatus for judging a reception intensity of an electromagnetic wave which conveys the connection request broadcast by the first transmission means is higher than a preset threshold value, the key information being generated by the second information processing apparatus and encrypted by the public key; and a first establishment means for decrypting the key information received by the first reception means by using a secret key corresponding to the public key and so that wireless communications encrypted by the key information may be established with the second information processing apparatus.

Further, a second information processing apparatus of the communication system in accordance with the present invention includes: a second reception means or receptor for receiving a connection request transmitted from the first information processing apparatus; a generation means or generator for generating a key information when a reception intensity of an electromagnetic wave which conveys the connection request is higher than a preset threshold value; a second transmission means for encrypting by means of a public key and transmitting to the first information processing apparatus the key information generated by the generation means; and a second establishment means for establishing wireless communication, encrypted by the key information, with the first information processing apparatus.

The first information processing apparatus of the present invention further includes: a transmission means or transmitter for wirelessly broadcasting a connection request containing a public key; a reception means or receptor for receiving a key information wirelessly transmitted from another information processing apparatus which judges a reception intensity of an electromagnetic wave for conveying the connection request broadcast by the transmission means is higher than a preset threshold value, the key information being generated by the other information apparatus and encrypted by the public key; and an establishing means for decrypting the key information received by the reception means by using a secret key corresponding to the public key so as to establish wireless communications encrypted by the key information with the other information processing apparatus, wherein the establishing means establishes the wireless communications with the other information processing apparatus when the reception intensity of the electromagnetic wave which conveys the key information transmitted from the other information processing apparatus is higher than the preset threshold value.

A first information processing method in accordance with the present invention includes: a transmission step of wirelessly broadcasting a connection request containing a public key; a reception step of receiving a key information wirelessly transmitted from another information processing apparatus which judges a reception intensity of an electromagnetic wave for conveying the connection request broadcast by processing the transmission step is higher than a preset threshold value, the key information being generated by the other information processing apparatus and encrypted by means of the public key; and an establishment step of decrypting the key information received by processing the reception step by using a secret key corresponding to the public key so as to establish wireless communication, encrypted by the key information, with the other information processing apparatus, wherein by processing the establishment step, the wireless communications are established with the other information processing apparatus when the reception intensity of the electromagnetic wave which conveys the key information transmitted from the other information processing apparatus is higher than the preset threshold value.

A first computer program of the present invention includes: a transmission step of wirelessly broadcasting a connection request containing a public key; a reception step of receiving a key information transmitted wirelessly from another information processing apparatus which judges a reception intensity of an electromagnetic wave for conveying a connection request broadcast by processing the transmission step is higher than a preset threshold value, the key information being generated by the other information processing apparatus and encrypted by means of the public key; and an establishment step of decrypting the key information, received by processing the reception step, by using the secret key corresponding to the public key so as to establish wireless communications encrypted by means of the key information with the other information processing apparatus, wherein by processing the establishment step, the wireless communications are established with the other information processing apparatus when the reception intensity of the electromagnetic wave which conveys the key information transmitted from the other information processing apparatus is higher than the preset threshold value.

A second information processing apparatus of the present invention includes: a reception means for receiving a connection request containing a public key transmitted from another information processing apparatus; a generation means for generating a key information when a reception intensity of an electromagnetic wave which conveys the connection request is higher than a preset threshold value; a transmission means for encrypting the key information, generated by the generation means, by means of the public key so as to transmit it to the other information processing apparatus; and an establishment means for establishing wireless communications encrypted by means of the key information with the other information processing apparatus.

The generation means can generate different key information each time an electromagnetic wave which conveys the connection request is received at reception intensity higher than the preset threshold value.

A second information processing method of the present invention includes: a reception step of receiving a connection request containing a public key transmitted from another information processing apparatus; a generation step of generating a key information when a reception intensity of an electromagnetic wave which conveys the connection request is higher than a preset threshold value; a transmission step of encrypting the key information, generated by processing the generation step, by means of the public key so as to transmit it to another information processing apparatus; and an establishment step of establishing wireless communication, encrypted by means of the key information, with the other information processing apparatus.

A second computer program of the present invention includes: a reception step of receiving a connection request containing a public key transmitted from another information processing apparatus; a generation step of generating a key information when a reception intensity of an electromagnetic wave which conveys the connection request is higher than a preset threshold value; a transmission step for encrypting by means of a public key and transmitting to the information processing apparatus the key information generated by the generation step; and an establishment step of establishing wireless communications encrypted by the key information with the other information processing apparatus.

A third information processing apparatus of the present invention includes: a reception means for receiving a connection request containing a public key transmitted from another information processing apparatus; a generation means for generating a key information when a reception intensity of an electromagnetic wave which conveys the connection request is higher than a preset threshold value; a first transmission means for encrypting the key information, generated by the generation means, by means the public key so as to transmit the encrypted key information to the other information processing apparatus together with an information data for connecting to a communication management device which manages wireless communication; and a second transmission means for transmitting the key information generated by the generation means to the communication management device by wire.

A third information processing method of the present invention includes: a reception step of receiving a connection request containing a public key transmitted from another information processing apparatus; a generation step of generating a key information when a reception intensity of an electromagnetic wave which conveys the connection request is higher than a preset threshold value; a first transmission step of encrypting the key information, generated by processing the generation step, by means of the public key so as to transmit the encrypted key information to the other information processing apparatus together with an information data for connecting to a communication management device which manages wireless communication; and a second transmission step of transmitting the key information generated by processing the generation step to the communication management device by wire.

A third computer program of the present invention includes: a reception step of receiving a connection request containing a public key transmitted from another information processing apparatus; a generation step of generating a key information when a reception intensity of an electromagnetic wave which conveys the connection request is higher than a preset threshold value; a first transmission step of encrypting the key information, generated by processing the generation step, by means of the public key so as to transmit the encrypted key information to the other information processing apparatus together with an information data for connecting to a communication management device which manages wireless communication; and a second transmission step of transmitting the key information generated by processing the generation step to the communication management device by wire.

In the communication system of the present invention, the connection request containing the public key is broadcast wirelessly means, the key information is received which is transmitted wirelessly from the second information processing apparatus for judging the reception intensity of the electromagnetic wave for conveying the broadcast connection request is higher than the preset threshold value, the key information being generated by the second information processing apparatus and encrypted by means of the public key. Further, the received key information is decrypted by using the secret key corresponding to the public key. The wireless communications encrypted by the key information is established with the second information processing apparatus. Further, when the connection request transmitted from the first information processing apparatus is received and the reception intensity of the electromagnetic wave which conveys the connection request is higher than the preset threshold value, then the key information is generated. The generated key information is encrypted by means of the public key so as to be transmitted to the first information processing apparatus, whereby the wireless communications encrypted by means of the key information is established with the first information processing apparatus.

In the first information processing apparatus and the first information processing method, and the first computer program of the present invention, the connection request containing the public key is broadcast wirelessly means, and the key information is received which is wirelessly transmitted from another information processing apparatus for judging the reception intensity of the electromagnetic wave for conveying the broadcast connection request is higher than the preset threshold value, the key information being generated by the other information processing apparatus and encrypted by means of the public key. Further, the received key information is decrypted by using the secret key corresponding to the public key, and the wireless communications encrypted by the key information is established with the other information processing apparatus. Establishment of the wireless communications is realized with the other information processing apparatus, when the reception intensity of the electromagnetic wave which conveys the key information transmitted from the other information processing apparatus is higher than the preset threshold value.

In the second information processing apparatus and the second information processing method, and the second computer program of the present invention, when the connection request is received which contains the public key transmitted from another information processing apparatus, and when the reception intensity of the electromagnetic wave which conveys the connection request is higher than the preset threshold value, then the key information is generated. Further, the generated key information is encrypted by means of the public key so as to be transmitted to another information processing apparatus, whereby the wireless communications encrypted by means of the key information is established with another information processing apparatus.

In the third information processing apparatus and the third information processing method, and the third computer program of the present invention, when the connection request is received which contains the public key transmitted from another information processing apparatus, and when the reception intensity of the electromagnetic wave which conveys the connection request is higher than the preset threshold value, then the key information is generated. Further, the generated key information is encrypted by means of the public key, and the encrypted key information is transmitted to another information processing apparatus together with the information data for connecting to the communication management device which manages the wireless communications. The generated key information is transmitted to the communication management device by wire.

Therefore, according to a preferred embodiment of the present invention, it is possible to start wireless communications easily and promptly.

Further, according to a preferred embodiment of the present invention, it is possible to secure wireless communications in which security is ensured, without requiring a complicated setup.

Furthermore, according to a preferred embodiment of the present invention, it is possible to prevent the wireless communications from being performed with a device which is not intended by a user.

The above and other objects, features and advantages of the present invention will become more apparent from the following description of the presently preferred exemplary embodiments of the invention taken in conjunction with the accompanying drawings, in which:

FIG. 12 is a flow chart for explaining a communication establishment process performed by the PDA, the access point, and the dummy point;

FIG. 13 is a view showing an example of a structure of a communication system to which the present invention is applied;

DETAILED DESCRIPTION OF THE PREFERRED EMBODIMENTS OF THE PRESENT INVENTION

Figure 1A:
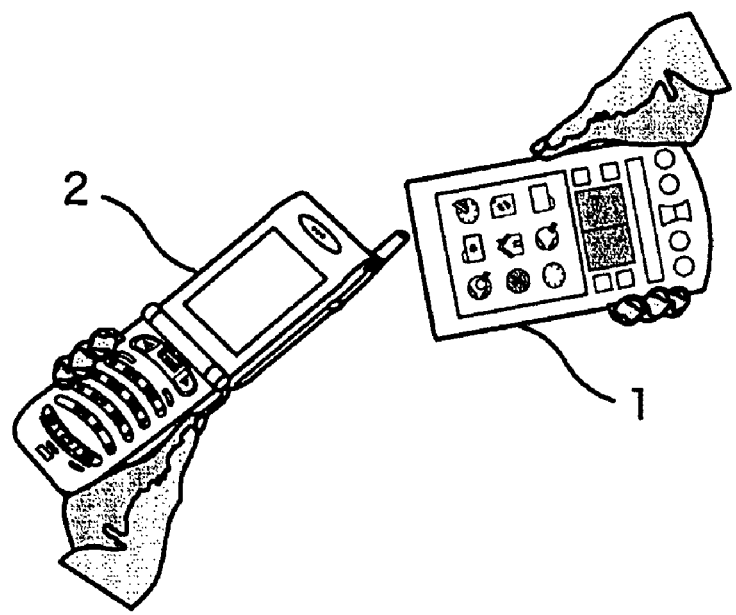
FIG. 1A and FIG. 1B are views showing a procedure of establishing ad hoc communications.

Hereafter, preferred embodiments of the present invention will be described. The description is for confirming that the preferred embodiments which support the invention recited in a claim is described in the present specification. Therefore, if there is an embodiment which is described in the preferred embodiments of the invention and not described herein as one corresponding to the invention, it does not mean that the embodiment does not correspond to the invention. In contrast, if the embodiment is described as one corresponding to the invention, it does not mean that the embodiment does not correspond to any invention other than the presently described invention.

Further, this description does not mean the entire invention as described in the present specification. In other words, this description does not deny existence of the invention which is described in the present specification but not claimed in this application, i.e. existence of the invention to be divided into a divisional application or to be added through amendments in the future.

According to a preferred embodiment of the present invention, a communication system is provided. The communication system is a communication system which includes a first information processing apparatus (for example, a PDA 1 of FIG. 1A) and a second information processing apparatus (for example, a portable phone 2 of FIG. 1A, an access point 51 of FIG. 7A). The first information processing apparatus includes: a first transmission means (for example, a connection request transmission unit 41 of FIG. 3) for wirelessly broadcasting a connection request containing a public key (for example, the public key Pk generated in step S2 of FIG. 4); a first reception means (for example, a wireless communication control unit 31 of FIG. 3 for performing a process of step S4 of FIG. 4) for receiving key information (for example, a session key S) transmitted wirelessly from the above-mentioned second information processing apparatus (for example, a portable phone 2 of FIG. 1A) which judges a reception intensity of an electromagnetic wave for conveying the above-mentioned connection request broadcast by the above-mentioned first transmission means is higher than a preset threshold value, a key information being generated by the above-mentioned second information processing apparatus and encrypted by the above-mentioned public key; and a first establishment means (for example, the wireless communication control unit 31 of FIG. 3 for performing a process in step S6 of FIG. 4) for decrypting the above-mentioned key information received by the above-mentioned first reception means by using a secret key (for example, a secret key Sk generated in step S2 of FIG. 4) corresponding to the above-mentioned public key so as to establish wireless communications (for example, wireless communications in accordance with the IEEE 802.11 communications standard or the Bluetooth communications standard), encrypted by the above-mentioned key information, with the above-mentioned second information processing apparatus.

Further, the second information processing apparatus includes: a second reception means (for example, the wireless communication control unit 31 of FIG. 3 for performing a process in step S21 of FIG. 4) for receiving the above-mentioned connection request transmitted from the above-mentioned first information processing apparatus; a generation means for generating the above-mentioned key information (for example, key information management unit 34 of FIG. 3) when the reception intensity of an electromagnetic wave for conveying the above-mentioned connection request is higher than a preset threshold value; a second transmission means (for example, the wireless communication control unit 31 of FIG. 3 for performing a process in step S26 of FIG. 4) for encrypting the above-mentioned key information, generated by the above-mentioned generation means, by means of the above-mentioned public key so as to transmit key information to the above-mentioned first information processing apparatus; and a second establishment means (for example, the wireless communication control unit 31 of FIG. 3 for performing a process in step S27 of FIG. 4) for establishing wireless communications, encrypted by means of the above-mentioned key information (for example, a wireless communications in accordance with the IEEE 802.11 communications standard or the Bluetooth communications standard), with the above-mentioned first information processing apparatus.

Also, according to a preferred embodiment of the present invention, a first information processing apparatus is provided. The information processing apparatus (for example, the PDA 1 of FIG. 1A) includes: a transmission means (for example, the connection request transmission unit 41 of FIG. 3) for wirelessly broadcasting a connection request containing a public key (for example, the public key Pk generated in step S2 of FIG. 4); a reception means (for example, the wireless communication control unit 31 of FIG. 3 for performing a process in step S4 of FIG. 4) for receiving key information (for example, the session key S) transmitted wirelessly from another information processing apparatus (for example, the portable phone 2 of FIG. 1A) which judges the reception intensity of an electromagnetic wave for conveying the above-mentioned connection request broadcast by the above-mentioned transmission means is higher than a preset threshold value, the key information being generated by the above-mentioned other information processing apparatus and encrypted with the above-mentioned public key; an establishment means (for example, the wireless communication control unit 31 of FIG. 3 for performing the process in step S6 of FIG. 4) for decrypting the above-mentioned key information, received by the above-mentioned reception means, by using a secret key (for example, the secret key Sk generated in step S2 of FIG. 4) corresponding to the above-mentioned public key so as to establish wireless communications, encrypted by the above-mentioned key information (for example, the wireless communications in accordance with the IEEE 802.11 communications standard or the Bluetooth communications standard), with the above-mentioned other information processing apparatus, wherein the above-mentioned establishment means establishes the above-mentioned wireless communications with the above-mentioned other information processing apparatus when the reception intensity of an electromagnetic wave which conveys the above-mentioned key information transmitted from the above-mentioned other information processing apparatus is higher than a preset threshold value (for example, the PDA 1 of FIG. 1A for performing the process in FIG. 6).

According to a preferred embodiment of the present invention, a first information processing method is provided. The information processing method includes: a transmission step (for example, step S3 of FIG. 4) of broadcasting a connection request containing a public key (for example, the public key Pk generated in step S2 of FIG. 4) wirelessly means; a reception step (for example, step S4 of FIG. 4) of receiving key information (for example, the session key S) generated by the above-mentioned other information processing apparatus (for example, the portable phone 2 of FIG. 1A) which judges the reception intensity of an electromagnetic wave for conveying the above-mentioned connection request broadcast by processing the above-mentioned transmission step is higher than a preset threshold value; and an establishment step (for example, step S6 of FIG. 4) of decrypting the above-mentioned key information received by processing the above-mentioned reception step by using a secret key (for example, the secret key Sk generated in step S2 of FIG. 4) corresponding to the above-mentioned public key, so as to establish wireless communications, encrypted by the above-mentioned key information (for example, the wireless communications in accordance with the IEEE 802.11 communications standard or the Bluetooth communications standard), with the other information processing apparatus, wherein the wireless communications is established with the above-mentioned other information processing apparatus, when the reception intensity of the electromagnetic wave for conveying the key information transmitted from other information processing apparatuses is higher than the preset threshold value.

According to a preferred embodiment of the present invention, a first computer program is provided. Also in the first computer program, the preferred embodiment to which each step corresponds (however, an example) is similar to the first information processing method of the present invention.

According to a preferred embodiment of the present invention, a second information processing apparatus is provided. The information processing apparatus (for example, the portable phone 2 of FIG. 1A, the access point 51 of FIG. 7A) includes: a reception means (for example, the wireless communication control unit 31 of FIG. 3 for performing the process in step S21 of FIG. 4) for receiving a connection request containing a public key (for example, the public key Pk generated in step S2 of FIG. 4) transmitted from another information processing apparatus (for example, the PDA 1 of FIG. 1A); a generation means for generating key information (for example, the key information management unit 34 of FIG. 3) when the reception intensity of an electromagnetic wave which conveys the above-mentioned connection request is higher than a preset threshold value; a transmission means for encrypting the above-mentioned key information, generated by the above-mentioned generation means, with the above-mentioned public key so as to be transmitted to the above-mentioned other information processing apparatus (for example, the wireless communication control unit 31 of FIG. 3 for performing the process in step S26 of FIG. 4); and an establishment means (for example, the wireless communication control unit 31 of FIG. 3 for performing the process in step S27 of FIG. 4) for establishing wireless communications with the above-mentioned other information processing apparatus, the wireless communications being encrypted by the above-mentioned key information (for example, the wireless communications in accordance with the IEEE 802.11 communications standard or the Bluetooth communications standard).

The above-mentioned generation means can generate different key information each time an electromagnetic wave which conveys the above-mentioned connection request is received at a reception intensity higher than the preset threshold value.

According to a preferred embodiment of the present invention, a second information processing method is provided. The information processing method includes: a reception step (for example, step S21 of FIG. 4) of receiving a connection request containing a public key (for example, the public key Pk generated in step S2 of FIG. 4) transmitted from another information processing apparatus (for example, the PDA 1 of FIG. 1A); a generation step (for example, step S24 of FIG. 4) of generating key information when the reception intensity of an electromagnetic wave which conveys the above-mentioned connection request is higher than a preset threshold value; a transmission step (for example, step S26 of FIG. 4) of encrypting the above-mentioned key information, generated by processing the above-mentioned generation step, by the above-mentioned public key, so as to be transmitted to the above-mentioned other information processing apparatus; and a establishment step (for example, step S27 of FIG. 4) of establishing wireless communications with the above-mentioned other information processing apparatus, the wireless communications being encrypted by means of the above-mentioned key information (for example, the wireless communications in accordance with the IEEE 802.11 communications standard or the Bluetooth communications standard).

According to a preferred embodiment of the present invention, a second computer program is provided. Also in the second computer program, the preferred embodiment (however, one example) to which each step corresponds is similar to the second information processing method of the present invention.

According to a preferred embodiment of the present invention, a third information processing apparatus is provided. The third information processing apparatus (for example, a dummy point 101-1 of FIG. 10A) includes: a reception means (for example, a wireless communication control unit 121 of FIG. 11 for performing a process in step S161 of FIG. 12) for receiving a connection request containing a public key (for example, the public key Pk generated in step S182 of FIG. 12) transmitted from another information processing apparatus (for example, the PDA 1 of FIG. 1A); a generation means (for example, key information management unit 124 of FIG. 11) for generating key information when the reception intensity of a electromagnetic wave which conveys the above-mentioned connection request is higher than a preset threshold value; a first transmission means (for example, the wireless communication control unit 121 of FIG. 11 for performing a process in step S166 of FIG. 12) for encrypting the above-mentioned key information, generated by the above-mentioned generation means, by means of the above-mentioned public key so as to transmit the above-mentioned encrypted key information to the above-mentioned other information processing apparatus together with information for connecting to a communication management device (for example, an access point 51 of FIG. 10A) which manages wireless communication; and a second transmission means (for example, a cable communication control unit 125 of FIG. 11 for performing a process in step S167 of FIG. 12) for transmitting the above-mentioned key information generated by the above-mentioned generation means to the above-mentioned communication management device by wire.

According to a preferred embodiment of the present invention, a third information processing method is provided. The third information processing method includes: a reception step (for example, step S161 of FIG. 12) of receiving a connection request containing a public key (for example, the public key Pk generated in step S182 of FIG. 12) transmitted from another information processing apparatus (for example, the PDA 1 of FIG. 1A); a generation step (for example, step S164) of generating key information when the reception intensity of an electromagnetic wave which conveys the above-mentioned connection request is higher than a preset threshold value; a first transmission step (for example, step S166 of FIG. 12) of encrypting the above-mentioned key information, generated by processing the above-mentioned generation step, by means of the above-mentioned public key so as to transmits the above-mentioned encrypted key information to the above-mentioned other information processing apparatus together with information for connecting to a communication management device (for example, the access point 51 of FIG. 10A) which manages wireless communication; and a second transmission step (for example, step S167 of FIG. 12) of transmitting the above-mentioned key information generated by processing the above-mentioned generation step to the above-mentioned communication management device by wire.

According to a preferred embodiment of the present invention, a third computer program is provided. Also in the third computer program, the preferred embodiment (however, one example) to which each step corresponds is similar to the third information processing method of the present invention.

Hereinafter, the preferred embodiments of the present invention will be described with reference to the attached figures.

Figure 1B:
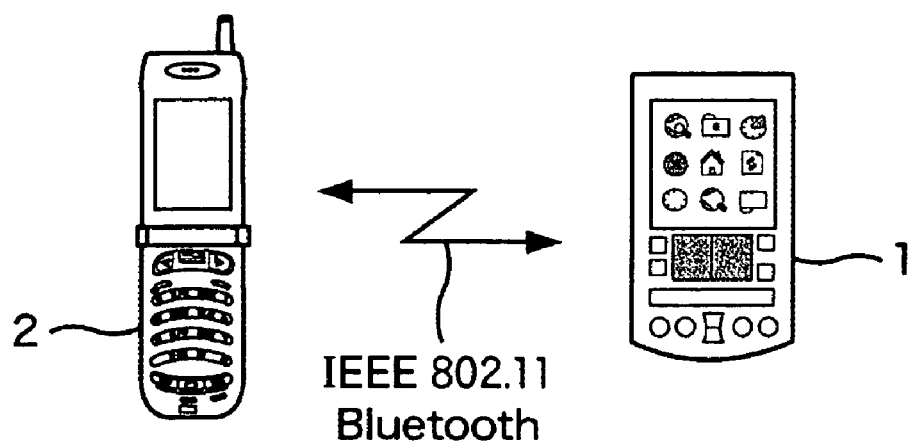

In the communication system to which the present invention is applied, FIG. 1A and FIG. 1B are views showing a procedure of establishing ad hoc communications between devices.

In the PDA 1 and the portable phone 2, for example, modules are included respectively which are capable of performing the wireless communications by means of the electromagnetic wave and which are complying with the IEEE (Institute of Electrical and Electronics Engineers) 802.11 communications standard (IEEE 802.11a/b/g etc.) or the Bluetooth (Bluetooth) communications standard.

For example, when a user operates a button provided on a surface of the PDA 1 and instructs the PDA 1 to be connected, the connection request containing an address of the PDA 1 etc. is broadcast from the PDA 1. As shown in FIG. 1A, when the PDA 1 and the portable phone 2 are in proximity with each other, and when it is determined that the reception intensity of the electromagnetic wave (electromagnetic wave which conveys the connection request) from the PDA 1 is equal to or higher than a preset threshold value, the portable phone 2 grants the request from the PDA 1 and communicates with the PDA 1.

At this event, the portable phone 2 newly generates an encryption key used for the communications with the PDA 1, and transmits the generated encryption key and a communication parameter, such as the address of the portable phone 2 to the PDA 1. In addition, in the connection request from the PDA 1, the public key generated by the PDA 1 is also contained, the encryption key (encryption key generated by means of the portable phone 2) encrypted by means of the public key and the communication parameter are transmitted from the portable phone 2 to the PDA 1.

Since the PDA 1 has a secret key (an individual key) corresponding to the public key which is broadcast and included in the connection request, the encryption key and the communication parameter which are transmitted from the portable phone 2 are acquired by using the secret key. As shown in a solid line arrow of FIG. 1B, the wireless communications complying with the IEEE 802.11 communications standard or the Bluetooth communications standard is established with the portable phones 2. Then, encrypted communications by using the encryption key generated by the portable phone 2 are performed with the PDA 1 and the portable phones 2.

As described above, only when the reception intensity of the connection request broadcast from one apparatus is equal to or higher than a threshold value, peer-to-peer type ad hoc communications not via the access point are started between both the devices. Therefore, without performing complicated setups, the user can establish communications promptly by means of an intuitive operation of bringing the device held by the user into proximity to a device by which the user intends to perform the wireless communications.

Further, since the encrypted communications are carried out by means of the encryption key generated by the portable phone 2 which is a device having received the connection request, even when there is another device within an electromagnetic wave covering area, the apparatus cannot intercept the information transmitted and received between the PDA 1 and the portable phone 2. In other words, the user can promptly establish the wireless communications in which safety is also secured. The processing before the communications are established between the PDA 1 and the portable phone 2 will be described later referring to a flow chart.

Figure 2:
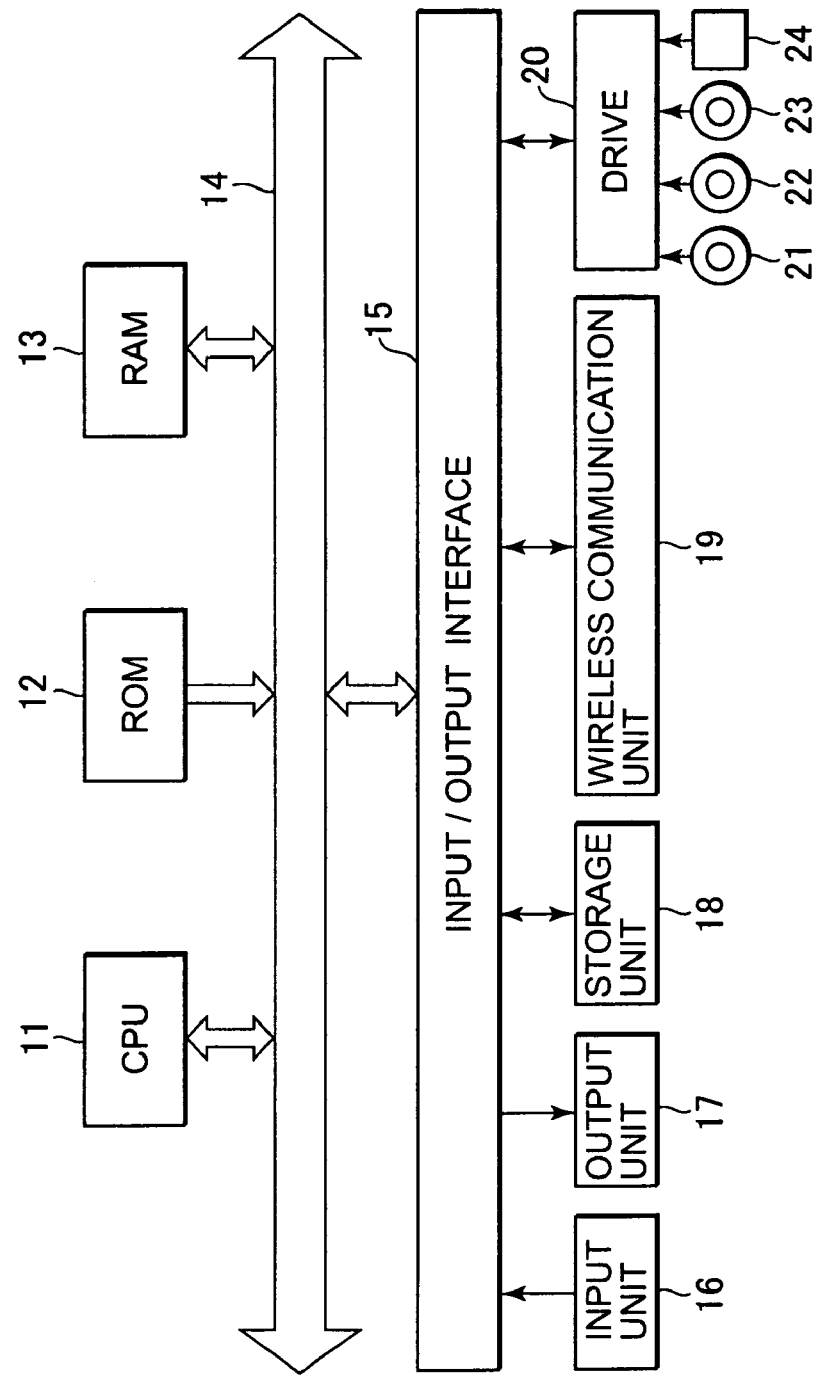
FIG. 2 is a block diagram showing an example of a structure of a PDA.

FIG. 2 is a block diagram showing an example a structure of the PDA 1.

A CPU (Central Processing Unit) 11 performs various types of processes according to a computer program loaded from a ROM (Read Only Memory) 12 or a storage unit 18 into a RAM (Random Access Memory) 13. In the RAM 13, data etc. are suitably stored which are necessary for the CPU 11 to perform various types of processes.

The CPU 11, the ROM 12, and the RAM 13 are mutually connected through a bus 14, and an input/output interface 15 is also connected with the bus 14.

Connected to the input/output interface 15 are various types of buttons and jog dials; an input unit 16 which is a touch panel etc. and superposed on, for example an LCD (Liquid Crystal Display) constituting an output unit 17; a display unit which is an LCD etc.; the output unit 17 which is a speaker, etc; and the storage unit 18 which is a flash memory etc.

Further, a wireless communication unit 19 which is a wireless communication module complying with the IEEE 802.11 communications standard or the Bluetooth communications standard is also connected to the input/output interface 15. The wireless communication unit 19 performs the wireless communications, complying with the IEEE 802.11 communications standard, for example, with the portable phones 2, under control of the CPU 11 through the bus 14 and the input/output interface 15.

A drive 20 is also connected to the input/output interface 15 as needed. A magnetic disk 21, an optical disc 22, an optical magnetic disc 23, a semiconductor memory 24, etc. are suitably installed in the drive 20.

Figure 3:
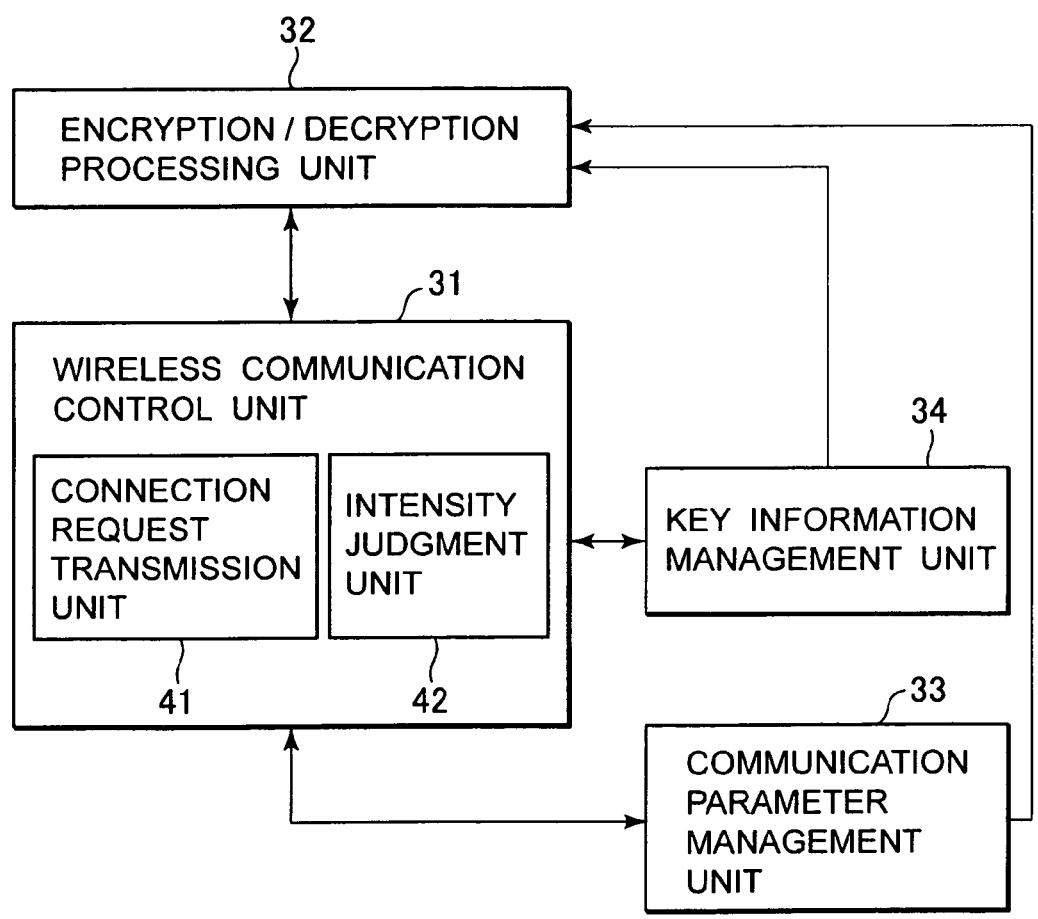
FIG. 3 is a block diagram showing an example of a functional structure of the PDA.

FIG. 3 is a block diagram showing an example of a functional structure of the PDA 1. Each function in FIG. 3 is realized by executing a control program by means of the CPU 11 of FIG. 2.

The wireless communication control unit 31 establishes the wireless communications with another device at the wireless communication unit 19 of FIG. 2 and controls the established wireless communications. Further, the wireless communication control unit 31 has a connection request transmission unit 41 and an intensity judgment unit 42. The connection request transmission unit 41 broadcasts the connection request containing the public key and an address of the PDA 1 etc., according to instructions from the user. The public key broadcast by the connection request transmission unit 41 is generated and supplied by the key information management unit 34. The intensity judgment unit 42 measures the reception intensity of the electromagnetic wave emitted, for example, by an external device in the wireless communication unit 19, and determines whether or not the reception intensity is equal to or higher than the threshold value.

By using the key information supplied from the key information management unit 34, an encryption/decryption processing unit 32 encrypts an information data to be transmitted to another device, and decrypts the information data when the information data received from another device is encrypted.

A communication parameter management unit 33 manages various types of parameters required for performing communications, for example, an ESSID (Extended Service Set ID) in the IEEE 802.11 communications, or a Bluetooth address, a Bluetooth clock, etc. in the Bluetooth communications.

The key information management unit 34 manages the encryption key provided by the device of a communication counterpart, generates the public key and the secret key corresponding to the public key as needed, and manages their key information. The key information managed by the key information management unit 34 is suitably provided for the encryption/decryption processing unit 32.

In addition, also the portable phone 2 of FIG. 1 fundamentally has the same structure as the structures of FIG. 2 and FIG. 3, except that a processing unit for a sound signal which is inputted when the user speaks and a communication unit for performing communications with a base station are added further. Therefore, hereafter, FIG. 2 and FIG. 3 are suitably referred to the structure of the portable phone 2.

Figure 4:
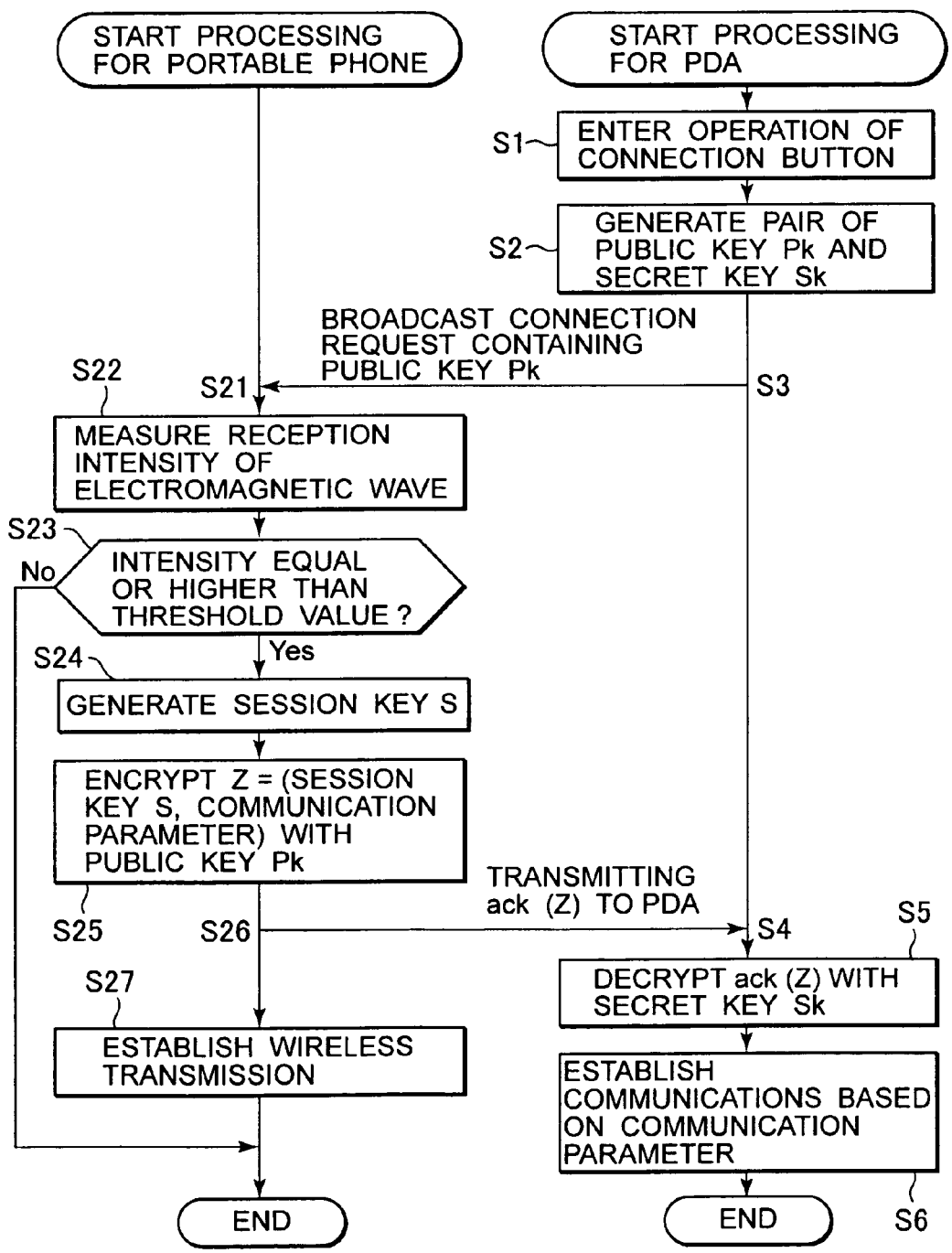
FIG. 4 is a flow chart for explaining a wireless communication establishment process performed by the PDA and a portable phone of FIG. 1.

Next, referring to a flow chart of FIG. 4, a wireless communication establishment process performed by the PDA 1 and the portable phone 2 of FIG. 1 will be described.

For example, when a connection button provided on a surface is depressed, the input unit 16 of the PDA 1 receives an input (operation of the connection button) from the user in step S1.

In step S2, the key information management unit 34 generates and manages a pair of the public key Pk and the secret key Sk (secret key Sk which can decrypt the information data encrypted by means of the public key Pk) corresponding to the public key Pk. The key information management unit 34 supplies the generated public key Pk to the wireless communication control unit 31. Then, the communication parameter containing the address of the PDA 1 etc. is also supplied from the communication parameter management unit 33 to the wireless communication control unit 31.

In step S3, the connection request transmission unit 41 controls the wireless communication unit 19 and broadcasts the connection request containing the public key Pk and the communication parameter. Since the connection request is not encrypted, a device which exists within a coverage area of the electromagnetic wave emitted from the wireless communication unit 19 of a PDA 11 can receive the connection request and acquire the public key Pk, etc.

When the portable phone 2 is within the coverage area of the electromagnetic wave from the PDA 1, in step S21 the wireless communication control unit 31 of the portable phone 2 receives the connection request transmitted from the PDA 1, and outputs the public key Pk contained in the connection request to the encryption/decryption processing unit 32. In step S22 the intensity judgment unit 42 of the portable phone 2 measures the reception intensity (reception intensity of the electromagnetic wave which conveys the connection request) of the connection request, moves the process to step S23, and determines whether or not the reception intensity is equal to or higher than the threshold value.

In step S23, when it is determined that the reception intensity of the connection request is lower than or equal to the threshold value, then the intensity judgment unit 42 terminates the process. Therefore, when a distance between the PDA 1 and the portable phone 2 is comparatively large, even if the portable phone 2 has received the connection request, subsequent communications are not performed between the PDA 1 and the portable phone 2.

On the other hand, in step S23 when it is determined that the reception intensity of the connection request is equal to or higher than the threshold value, the intensity judgment unit 42 grants the request from the PDA 1, and specifies the PDA 1 as a device of the communication counterpart. Therefore, as shown in FIG. 1A, when the connection request is broadcast from the PDA 1 in proximity with the portable phone 2, the PDA 1 is specified as the device of the communication counterpart of the portable phone 2.

A field intensity of the electromagnetic wave (electric power density per unit area) decreases inversely proportionally to the square of a distance from a transmission source, therefore, a device having received the connection request can determine whether the device broadcasting the connection request is the one in proximity or the one located in a comparatively distant position, based on the field intensity of the received electromagnetic wave.

For example, on the reception intensity in the portable phone 2, there is a ten times difference between a packet transmitted from the device in a position 10 cm away from the portable phone 2 and a packet transmitted from the device in a position 1 m away from the portable phone 2 (the intensity of the packet transmitted from the device which is located in the position 10 cm away from the portable phone 2 is ten times higher), so that the device which receives the connection request can substantially reliably determine whether or not the device which transmits it is the one in proximity, even if there are somewhat irregularities in the output.

Turning back to FIG. 4, when the PDA 1 is specified as the device of the communication counterpart, the key information management unit 34 of the portable phone 2, in step S24, generates the session key S which is a common key. After the wireless communications are established with the PDA 1, the session key S is used for encrypting the transmitted and received information data and for decrypting the encrypted information data. In addition, the session key S is generated at random for connection at this event. A different key is generated for each set of the processes of FIG. 4. The session key S generated by the key information management unit 34, and the communication parameters, such as the address of the portable phone 2, managed by the communication parameter management unit 33 are outputted to the encryption/decryption processing unit 32.

In step S25, the encryption/decryption processing unit 32 encrypts the session key S and the communication parameter (Z=(the session key S, the communication parameter)) by using the public key Pk provided by the PDA 1, and supplies the encrypted information data to the wireless communication control unit 31. In step S26, the wireless communication control unit 31 returns the session key S encrypted by means of the public key Pk and the communication parameter to the PDA 1 as an ack (Z) (acknowledge(Z)). Thus, the session key S generated by the portable phone 2 is encrypted by means of the public key Pk and returned to the PDA 1, so that only the PDA 1 having the secret key Sk can decrypt and acquire the session key S.

The wireless communication control unit 31 of the PDA 1, in step S4, receives the ack (Z) returned from the portable phone 2, and outputs the received ack (Z) to the encryption/decryption processing unit 32.

In step S5, the encryption/decryption processing unit 32 of the PDA 1 decrypts the ack (Z) returned from the portable phone 2 by using the secret key Sk managed by the key information management unit 34, and acquires the communication parameter and the session key S generated by the portable phone 2.

In step S6, by using the communication parameter acquired by the encryption/decryption processing unit 32, the wireless communication control unit 31 establishes the wireless communications with the portable phones 2, complying with the IEEE 802.11 communications standard or the Bluetooth communications standard. On the other hand, in step S27, based on the communication parameter contained in the connection request from the PDA 1, the portable phone 2 establishes the wireless communications with the PDA 1, complying with the IEEE 802.11 communications standard or the Bluetooth communications standard.

At this event, in the case of the wireless communications complying with the IEEE 802.11 communications standard, a MAC (Media Access Control) address, an IP address, the ESSID, etc. of both the devices are set up between the PDA 1 and the portable phones 2, and a setup by using the session key S as a WEP (Wired Equivalent Privacy) key etc. are performed. Further, in the case of the wireless communications complying with the Bluetooth communications standard, a setup based on the Bluetooth address or a Bluetooth clock, a setting by using the session key S as an encryption key etc. are performed.

After various types of setups are performed, the wireless communications encrypted by means of the session key S are started between the PDA 1 and the portable phone 2. In addition, the wireless communications started here do not necessarily require both the devices to be in proximity to each other, but are effective within the coverage area of the electromagnetic wave.

As described above, based on the reception intensity of the electromagnetic wave, it is arranged to determine whether or not a device is a communication counterpart, so that the user can start the wireless communications only by bringing the devices into proximity.

Further, by using the wireless communication module (the wireless communication unit 19 of FIG. 2) in accordance with the IEEE 802.11 communications standard or the Bluetooth communications standard, it is arranged to determine whether or not the device is in proximity and to transmit and receive the communication parameter, so that it is not necessary to provide the device with a dedicated module, such as the RF tag, the reader/writer, the infrared module, etc. only for detecting a neighboring device and for transmitting and receiving an information data required for establishing communications. Therefore, as compared with the case of preparing such a dedicated module, production costs of the device can be reduced.

Further, since the wireless communications encrypted by means of the newly generated session key are carried out, an interception, a falsification etc. by a third party can be prevented.

Figure 5:
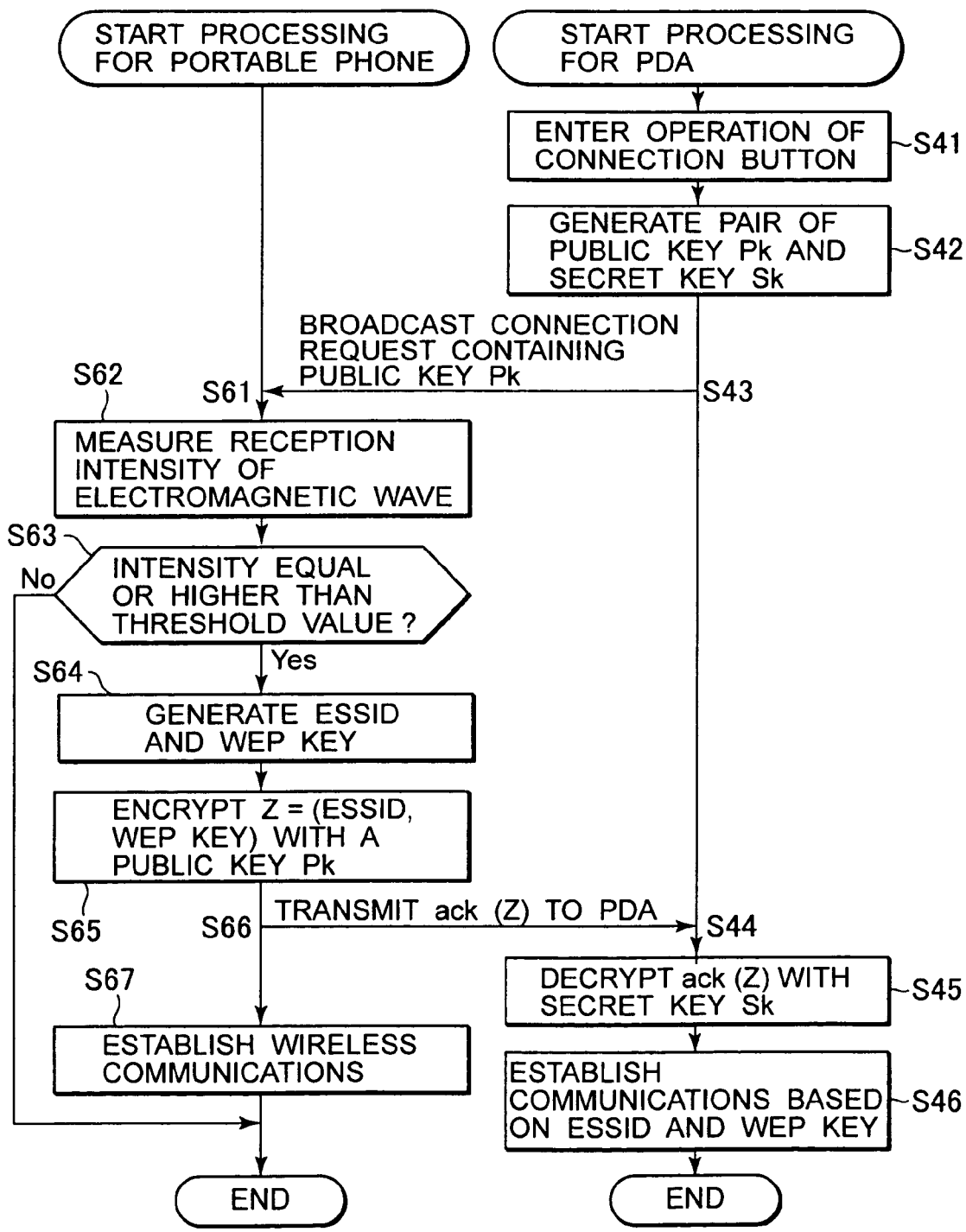
FIG. 5 is a flow chart for explaining an example of a process in FIG. 4.

FIG. 5 is a flow chart for explaining a process before the wireless communications complying with the IEEE 802.11 communications standard between the PDA 1 and a portable phone 2 of FIG. 1 are established. A process in FIG. 5 is basically similar to the process in FIG. 4, and its detailed description will be properly omitted.

In step S41 when the operation, by the user, of the connection button is received by the input unit 16, then in step S42 the key information management unit 34 of the PDA 1 generates the pair of the public key Pk and the secret key Sk. In step S43 the connection request transmission unit 41 broadcasts the connection request containing the public key Pk generated by the key information management unit 34 and the communication parameter managed by the communication parameter management unit 33.

In step S61 the wireless communication control unit 31 of the portable phone 2 which exists within the coverage area of the electromagnetic wave from the PDA 1 receives the connection request. In step S62 the intensity judgment unit 42 measures the reception intensity of the connection request, moves the process to step S63, and determines whether or not the reception intensity is equal to or higher than a threshold value.

In step S63 when it is determined that the reception intensity of the connection request is lower than the threshold value, the intensity judgment unit 42 terminates the process. On the other hand, when it is determined that it is equal to or higher than the threshold value, the PDA 1 is specified as the device of the communication counterpart. When the PDA 1 is specified as the device of the communication counterpart, in step S64 the key information management unit 34 of the portable phone 2 newly generates a WEP key to be used for the wireless communications with the PDA 1 in accordance with the IEEE 802.11 communications standard, and the communication parameter management unit 33 newly generates an ESSID which identifies the communications. The thus generated ESSID and the WEP key are outputted to the encryption/decryption processing unit 32.

In step S65 the encryption/decryption processing unit 32 encrypts the ESSID and the WEP key (Z=(the ESSID, the WEP key)) by using the public key Pk, the encrypted information data is supplied to the wireless communication control unit 31. In step S66 the wireless communication control unit 31 returns the ack (Z) containing the encrypted ESSID and WEP key to the PDA 1. In this way the newly generated ESSID and WEP key are encrypted by means of the public key Pk provided by the PDA 1 and returned to the PDA 1, so that only the PDA 1 having the secret key Sk can decrypt and acquire the ESSID and the WEP key.

In step S44 the wireless communication control unit 31 of the PDA 1 receives the ack (Z) returned from the portable phone 2. In step S45 the encryption/decryption processing unit 32 decrypts the ack (Z) by using the secret key Sk managed by the key information management unit 34, and acquires the ESSID and the WEP key generated by the portable phone 2.

In step S46, based on the acquired ESSID and the WEP key, the wireless communication control unit 31 establishes the wireless communications with the portable phones 2, complying with the IEEE 802.11 communications standard. On the other hand, in step S67, similar to the wireless communication control unit 31 of the PDA 1, based on the information included in the connection request, the wireless communication control unit 31 of the portable phone 2 establishes the wireless communications with the PDA 1, complying with the IEEE 802.11 communications standard.

As described above, by bringing devices into proximity to each other, the user can establish the wireless communications between the devices, complying with the IEEE 802.11 communications standard in which security is ensured. Further, in order to establish the wireless communication, it is not necessary to provide both the devices with modules for short distance communications other than the communication modules in accordance with the IEEE 802.11 communications standard.

Referring now to a flow chart of FIG. 6, another wireless communication establishment process performed by the PDA 1 and the portable phone 2 of FIG. 1 will be described.

Figure 6:
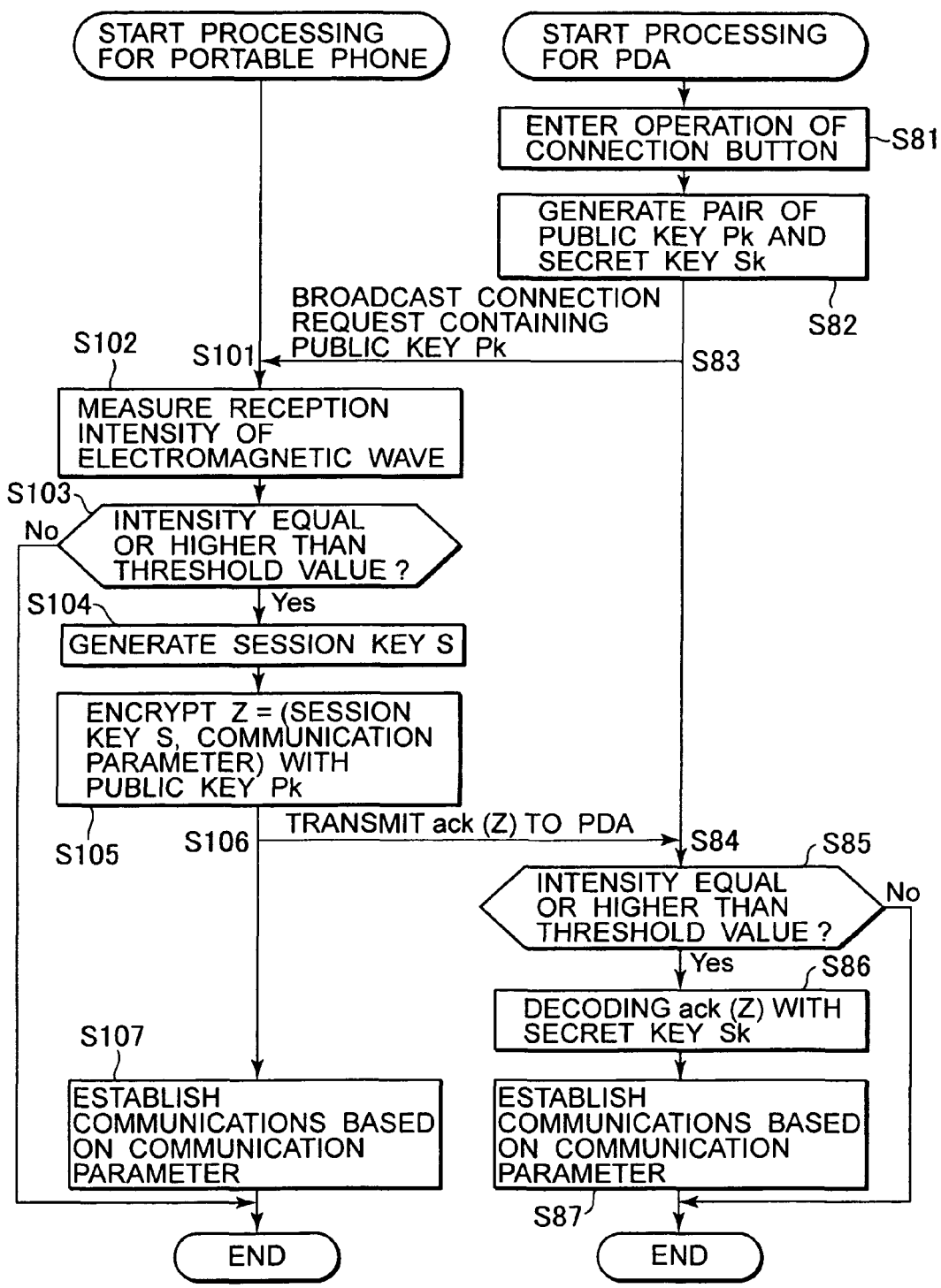
FIG. 6 is a flow chart for explaining another wireless communication establishment process performed by the PDA and the portable phone of FIG. 1.

The process in FIG. 6 is similar to the process as described above with reference to FIG. 4, except that the PDA 1 determines whether or not the reception intensity of the ack (Z) returned from the portable phone 2 to the PDA 1 is equal to or higher than the threshold value. Thus, possible double descriptions will be suitably omitted.

In step S84 when the ack (Z) containing the session key S and the communication parameter which are encrypted by the public key Pk are received by the wireless communication control unit 31 of the PDA 1, then in step S85 the intensity judgment unit 42 of the PDA 1 determines whether or not the reception intensity of the electromagnetic wave which conveys the ack (Z) is equal to or higher than the threshold value. In step S85 when it is determined that the reception intensity is lower than or equal to the threshold value, the intensity judgment unit 42 notifies the portable phone 2, for example, that communications cannot be carried out, and terminates the process.

Thus, they are in proximity when transmitting the connection request (at the time of carrying out the process in step S83). For example, if they are separated immediately after that, the wireless communications are not performed between the PDA 1 and the portable phone 2.

In step S85, when it is determined that the reception intensity of a reply from the portable phone 2 is equal to or higher than the threshold value, i.e., when it is determined that a status is continuing where the PDA 1 and the portable phone 2 are in proximity to each other, it moves the process to step S86. The encryption/decryption processing unit 32 of the PDA 1 decrypts the ack (Z) by using the secret key Sk, and acquires the session key S and communication parameter which are generated by the portable phone 2. Then, by using the session key S and the communication parameter which are acquired by the encryption/decryption processing unit 32, the wireless communication control unit 31 establishes the wireless communications with portable phones 2.

As described above, the PDA 1 is caused to determine the reception intensity of the reply to the connection request, to thereby reliably specify the device which establishes the wireless communications and prevent the wireless communications from being established with the devices which are not intended by the user.

Further, the communication is not performed even with a device which is not actually in proximity but broadcasts the connection request at a high output level from a distant position. In other words, when the judgment of the reception intensity of the reply to the connection request is not carried out in the PDA 1, the PDA 1 broadcasts the connection request at a high output level from the position distant from the portable phone 2, so that the portable phone 2 determines that the PDA 1 is in proximity (the process in step S103 determines that the reception intensity is equal to or higher than the threshold value). Then, the wireless communications are established between the PDA 1 and the portable phone 2. The PDA 1 may also be caused to determine the reception intensity of the electromagnetic wave, to thereby prevent the wireless communications as described above from being established. That is to say, the communications are established only between the devices which are actually in proximity to each other.

In addition, when both devices transmit the connection request and the reply (ack (Z)) corresponding to it at a high output level, the communications are established between the devices even when they are not in proximity to each other, so that the broadcast connection request and the reply corresponding thereto may include an information data indicating an output level of the electromagnetic wave.

Further, the PDA 1 having transmitted the connection request may not measure the reception intensity of the reply from the portable phone 2 so as to determine whether or not to carry out communications, but the output of the reply from the portable phone 2 may be restricted in order for the electromagnetic wave which conveys ack (Z) to cover only a small area. This may prevent the communications from being established between the device which broadcasts the connection request from the distant position at a high output level and the device which receives it.

A case has been described above where the ad hoc communications are established by bringing the devices into proximity to each other. Similarly, infrastructure communications can also be established by bringing a device into proximity to an access point.

Figure 7A:
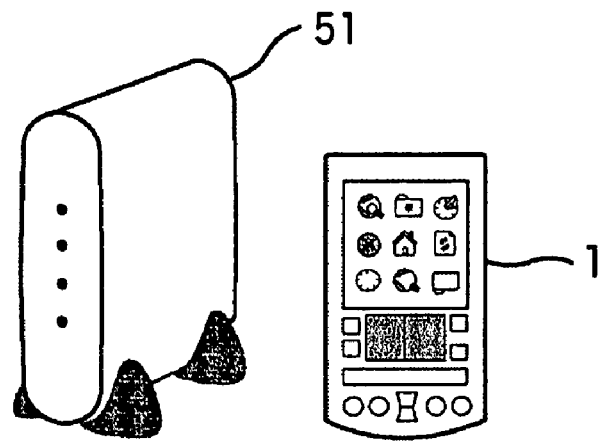
FIGS. 7A and 7B are views showing a procedure of establishing infrastructure communications.
Figure 7B:
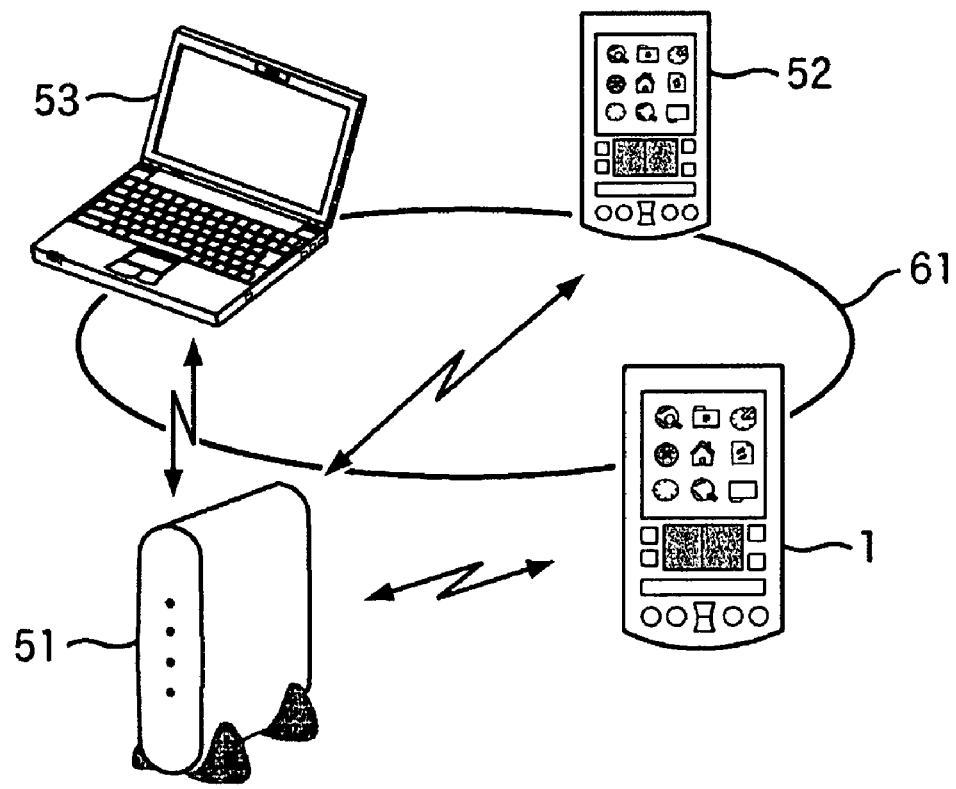

FIGS. 7A and 7B are views for explaining a procedure of establishing the infrastructure communications in the communication system to which the present invention is applied.

Similar to the PDA 1, the access point 51 includes therein the wireless communication module complying with the IEEE 802.11 communications standard or the Bluetooth communications standard, for example.

For example, as shown in FIG. 7A, when the user instructs the PDA 1 held by the user to connect to the access point 51, with the PDA 1 being brought into proximity to the access point 51, the connection request is broadcast from the PDA 1. When the access point 51 determines that the reception intensity is equal to or higher than a preset threshold value, the communication parameter, such as the ESSID, and the WEP keys, are generated by the access point 51. The generated communication parameter and the WEP key are encrypted by the public key which is included in the connection request and supplied from the PDA 1 to the access point 51, then returned to the PDA 1. Based on the ESSID and WEP key, the PDA 1 connects to the access point 51.

Further, before the PDA 1 connects to the access point 51, when the network to which another device belongs to is already managed by the access point 51, the device is notified of the newly generated ESSID and the WEP key, the setup is changed in each device. In this way, the network is formed containing the device already connected to the access point 51 and the PDA 1 newly connected to the access point 51.

For example, as shown in FIG. 7B, before the PDA 1 connects to the access point 51, when the network constituted by a device 52 and a device 53 is managed by the access point 51, the ESSID and the WEP key newly generated corresponding to receiving a connection request from the PDA 1 are notified also to the device 52 and the device 53, thus changing the setup in each device. In this way, a network 61 is newly formed by the PDA 1, the device 52, and the device 53 (an infrastructure connection type wireless communications are established).

Therefore, the user can cause the PDA 1 to participate in the network promptly by just bringing the PDA 1 into proximity to the access point 51, without performing complicated operations, such as setting the same ESSID and the same WEP key as those set in another device to, the PDA 1.

Further, since a network setup is changed in each device by means of the ESSID and the WEP key having newly generated by the access point 51, a more secure network can be formed. For example, even when the ESSID and the WEP key are known to those who are malicious, each time a new device participates in the network, the ESSID and the WEP key are updated, so that the ESSID and the WEP key known to those who are malicious cannot intercept the information data transmitted and received in the network where the setup is updated.

Figure 8:
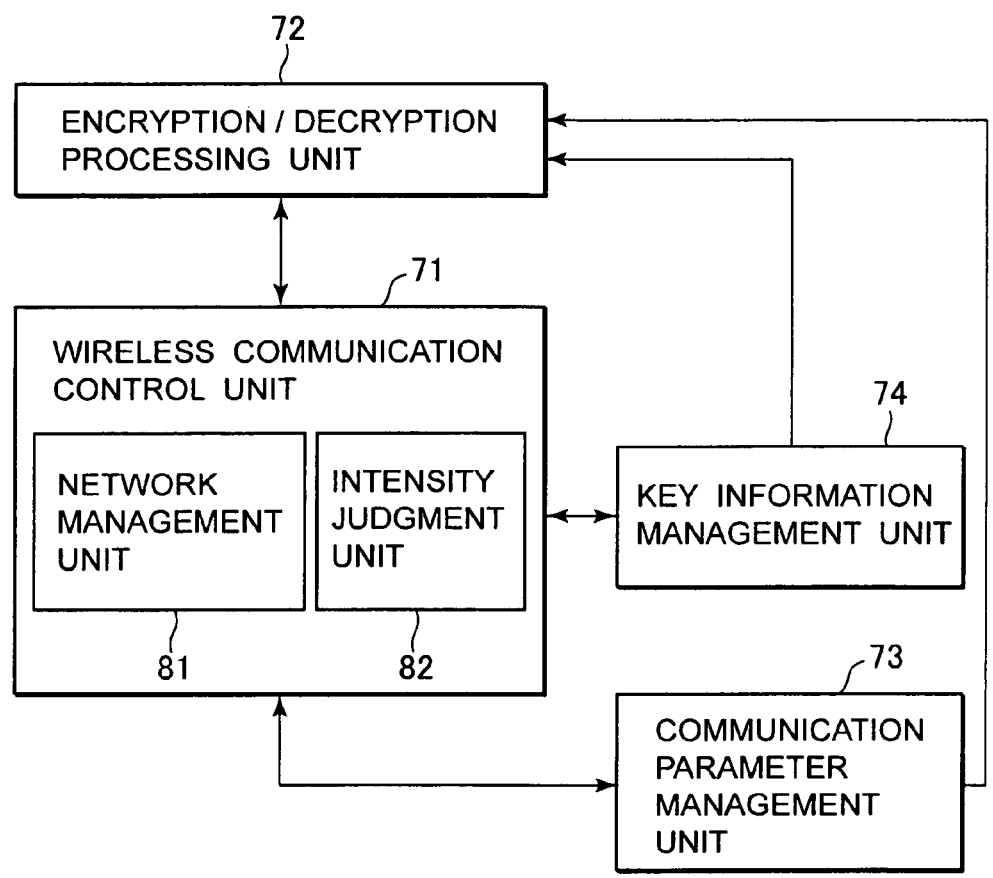
FIG. 8 is a block diagram showing an example of a structure of an access point.

FIG. 8 is a block diagram showing an example of a functional structure of the access point 51. In addition, the access point 51 has substantially the same structure as the structure of the PDA 1 as shown in FIG. 2. Therefore, FIG. 2 is suitably referred to as a structure for the access point 51.

The wireless communication control unit 71 of FIG. 8 controls the wireless communications with another device performed in the wireless communication unit 19 of FIG. 2. The wireless communication control unit 71 has a network management unit 81 and an intensity judgment unit 82. The network management unit 81 provides a router function or a DHCP (Dynamic Host Configuration Protocol) function to the devices which participate in the network, and performs a process of notifying the devices having already participated in the network of the newly generated ESSID and the WEP key. Similar to the intensity judgment unit 42 of the PDA 1 of FIG. 3, the intensity judgment unit 82 measures the reception intensity of the electromagnetic wave emitted by an external device, and determines whether or not the reception intensity is equal to or higher than the preset threshold value.

An encryption/decryption processing unit 72 encrypts the information data to be transmitted to another device, and decrypts the information received from another device when it is encrypted.

A communication parameter management unit 73 manages various types of parameters required for performing communications, for example, the ESSID in the IEEE 802.11 communications or the Bluetooth address, the Bluetooth clock etc. in the Bluetooth communications.

Key information management unit 74 generates encryption keys, such as the WEP key provided for the device participating in the network.

Figure 9:
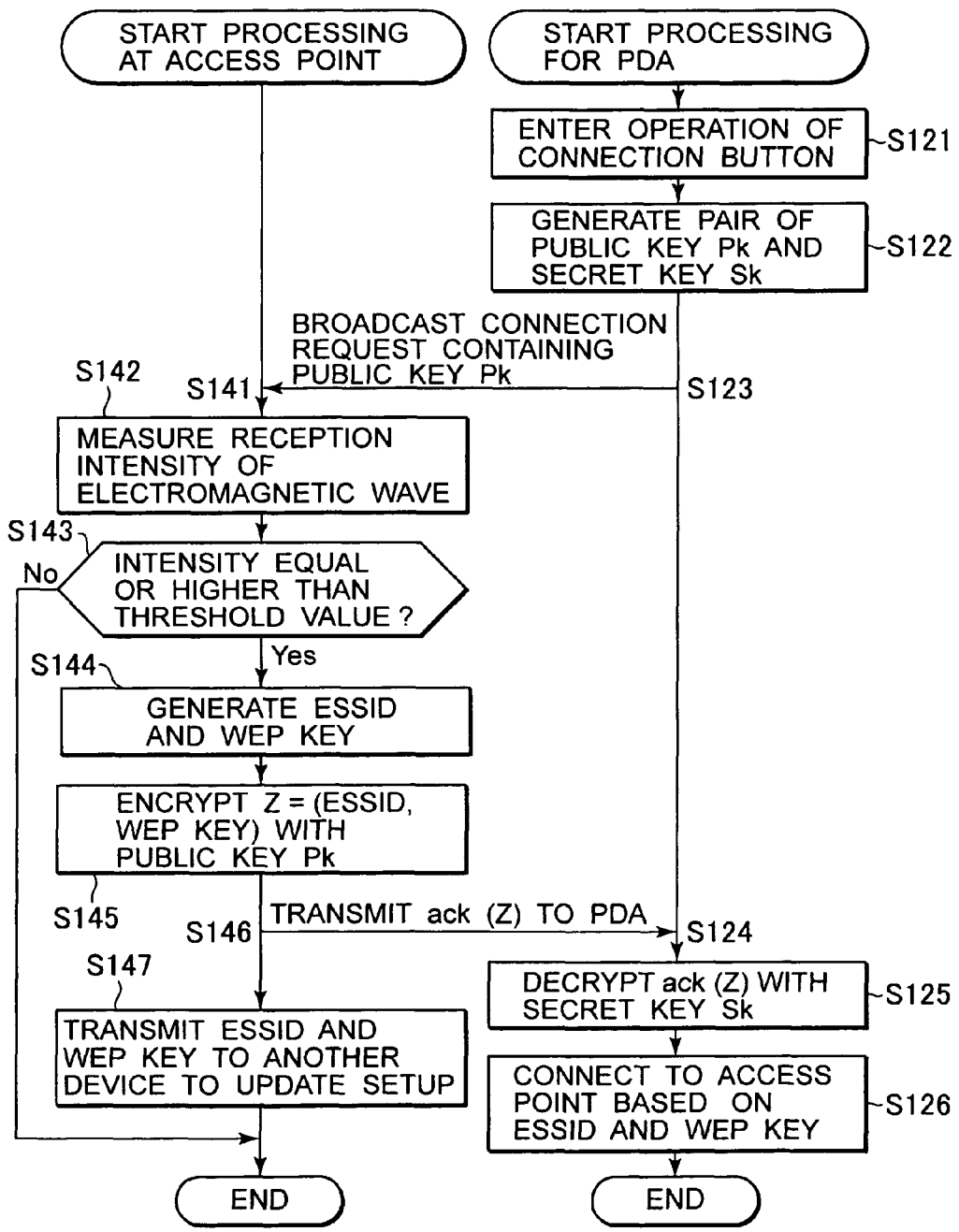
FIG. 9 is a flow chart for explaining a process performed by the PDA and the access point.

Next, referring to a flow chart of FIG. 9, the wireless communication establishment process performed between the PDA 1 and the access point 51 of FIG. 7A will be described.

When the operation button is depressed and the PDA 1 is instructed by the user to participate in the network, in step S121, the input unit 16 of the PDA 1 receives such instructions. In step S122, the key information management unit 34 generates the public key Pk and the secret key Sk corresponding to the public key Pk. In step S123, the connection request transmission unit 41 broadcasts the connection request containing the public key Pk and the communication parameter.

The wireless communication control unit 71 of the access point 51 which exists within the coverage area of the electromagnetic wave from the PDA 1 receives the connection request broadcast by the PDA 1, in step S141. In step S142, the intensity judgment unit 82 of the access point 51 measures the reception intensity of the connection request, and moves the process to step S143 so as to determine whether or not the measured reception intensity is equal to or higher than the threshold value.

In step S143, when it is determined that the reception intensity of the connection request is lower than or equal to the threshold value, the intensity judgment unit 82 terminates the process. On the other hand, when it is determined that is equal to or higher than the threshold value, it grants the request from the PDA 1, and allows participation in the network.

In step S144, the communication parameter management unit 73 and the key information management unit 74 of the access point 51 newly generates an ESSID and a WEP key respectively, and outputs the generated ESSID and WEP key to the encryption/decryption processing unit 72.

In step S145, the encryption/decryption processing unit 72 encrypts the ESSID and the WEP key (Z=(the ESSID. the WEP key)) by using the public key Pk provided by the PDA 1, and outputs the encrypted information data to the wireless communication control unit 71. In step S146, the network management unit 81 returns the encrypted ESSID and the encrypted WEP key as the ack (Z) to the PDA 1.

Further, when the network constituted by a plurality of devices is already managed, the network management unit 81, in step S147, provides the ESSID and the WEP key generated in step S144 to all the devices participating in the network, and updates the setup in each device. For example, since the newly generated ESSID and WEP key are transmitted to each device by encrypting by means of the WEP key having so far used in the network, the newly generated ESSID and WEP key are not intercepted by a third party.

On the other hand, the wireless communication control unit 31 of the PDA 1, in step S124, receives the ack (Z) returned from the access point 51. In step 125, the encryption/decryption processing unit 32 decrypts the ack (Z) by using the secret key Sk, to thereby acquire the ESSID and the WEP key generated by the access point 51.

In step S126, based on the ESSID and the WEP key acquired by the encryption/decryption processing unit 32, the wireless communication control unit 31 connects to the access point 51 so as to participate in the network managed by the access point 51.

In this way, the infrastructure connection type network is formed which is constituted by devices identified by the ESSID which is newly generated by the access point 51, so that it becomes possible to transmit and receive the information through the access point 51 between those devices.

As described above, the user can establish even infrastructure communications by just bringing the device held by the user into proximity to the access point and build a network, without preparing modules, such as the RF tag, the reader/writer, etc., in addition to the modules in accordance with the IEEE 802.11 communications standard etc. Further, since the ESSID and the WEP key are newly generated so as to change the setup in each device participating in the network, the user can build a more secure network.

As described above, the user brings the device held by the user into proximity to the access point, so as to cause the device to participate in the network. However, a case often occurs in which the access point is provided in a position to which the user cannot bring the device into proximity, such as the vicinity of ceiling indoors, for example. Therefore, apart from the access point provided in the vicinity of the ceiling etc., the user may provide a dummy point which does not have the function of managing the network, only by providing the newly generated ESSID and the WEP key in a position to which the user can easily bring the device into proximity. In this case, by bringing the device held by the user into proximity to the dummy point, the user can cause the device to participate in the network managed by the access point.

Figure 10A:
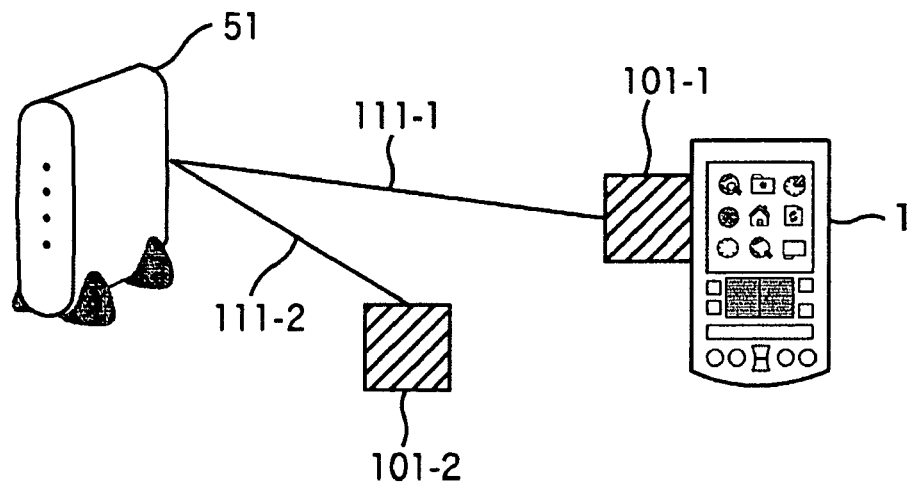
FIGS. 10A and 10B are views showing a procedure of establishing the infrastructure communications by bringing a device into proximity to a dummy point.
Figure 10B:
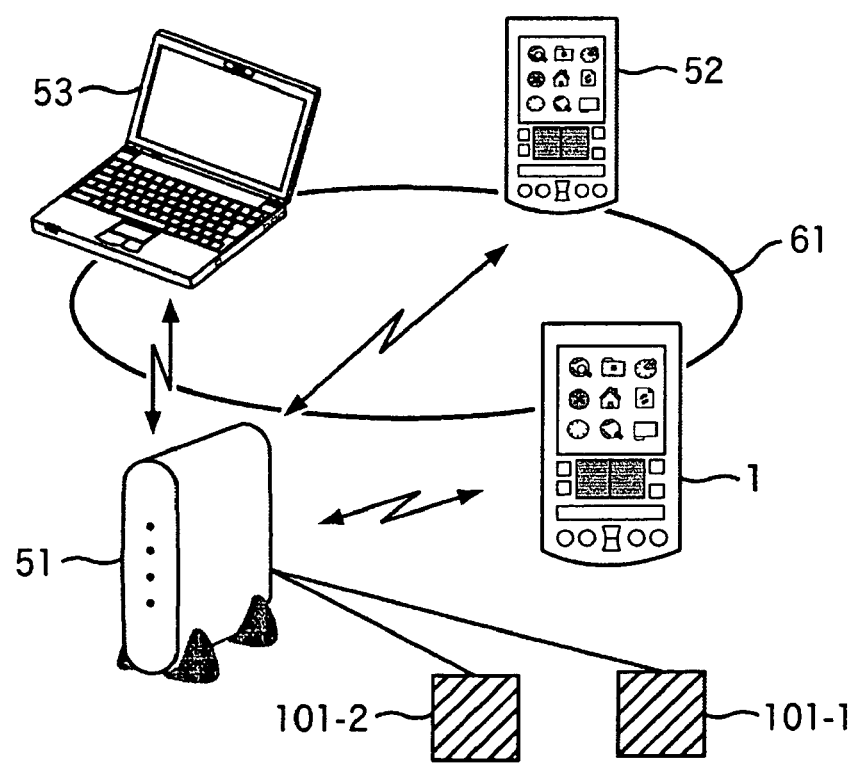

FIGS. 10A and 10B are views showing a procedure of establishing the infrastructure communications by bringing the device into proximity to the dummy point in the communication system to which the present invention is applied.

Unlike the access point 51, the dummy point 101-1 and the dummy point 101-2 of FIG. 10A are provided in positions to which the user can easily bring the PDA 1 into proximity, and respectively connected to the access point 51 by wire through a cable 111-1 and a cable 111-2.

The dummy point 101-1 and the dummy point 101-2 have the wireless communication functions complying with the IEEE 802.11 communications standard or the Bluetooth communications standard, and provide the PDA 1 with the newly generated ESSID and the WEP key when it is determined that the PDA 1 is brought into proximity according to the reception intensity of the electromagnetic wave. Further, at this event, the dummy point 101-1 and the dummy point 101-2 transmit the same ESSID and the WEP key as those provided by the PDA 1, to the access point 51 through the cable 111-1 and the cable 111-2.

The subsequent processes are similar to those in the case of FIGS. 7A and 7B. In other words, the access point 51 notifies the ESSID and the WEP key notified by the dummy point 101-1 or the dummy point 101-2 to all the devices having already participated in the network, causes them to update the setups, and grants the connection of the PDA 1 having acquired the ESSID and the WEP key from the dummy point 101-1 or the dummy point 101-2, whereby the network 61 containing the PDA 1 is formed as shown in FIG. 10B.

In this way, even when the access point 51 is provided in a position to which the PDA 1 cannot be brought into proximity, the user can cause the PDA 1 to participate in the network managed by the access point 51, by bringing the PDA 1 into proximity to the dummy point 101-1 or the dummy point 101-2.

Figure 11:
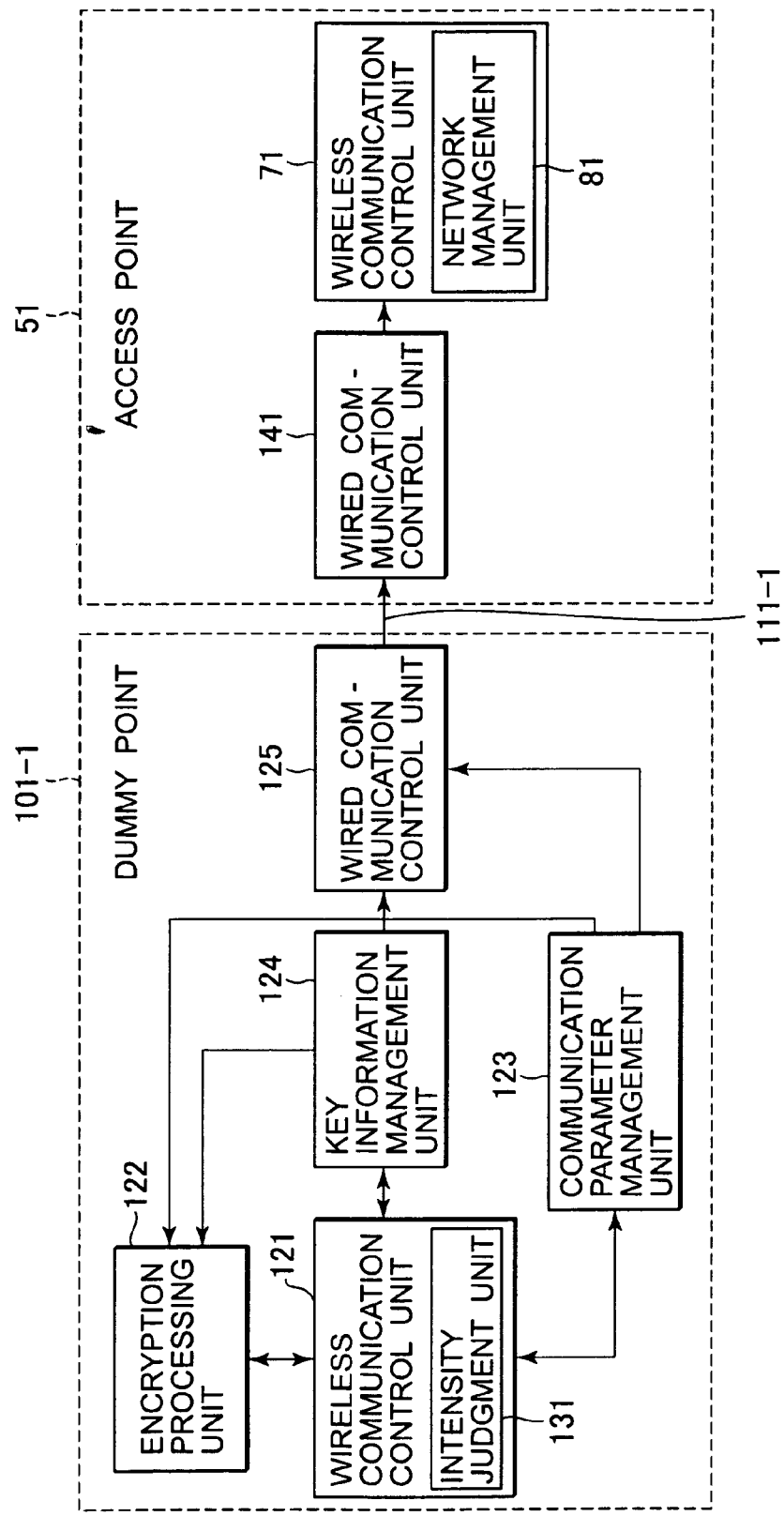
FIG. 11 is a block diagram showing an example of a structure of the access point and the dummy point.

FIG. 11 is a block diagram showing an example of a functional structure of the access point 51 and the dummy point 101-1. In addition, also the dummy point 101-2 has the same structure of the dummy point 101-1 as shown in FIG. 11, and is connected with the access point 51. The same reference numerals are used for the same parts as in the access point 51 of FIG. 8.

Also the dummy point 101-1 has the same structure as that of the access point 51 of FIG. 8, except that a functional unit for managing the network is not provided. That is to say, the wireless communication control unit 121 controls the wireless communications complying with the IEEE 802.11 communications standard or the Bluetooth communications standard performed between the devices which are in proximity to each other; an intensity judgment unit 131 measures the reception intensity of the electromagnetic wave emitted from the external device and determines whether or not the reception intensity is equal to or higher than the preset threshold value.

By using the public key Pk which is included in the connection request and provided by the PDA 1, an encryption processing unit 122 encrypts the ESSID generated by a communication parameter management unit 123 and the WEP key generated by the key information management unit 124, so as to be provided from the wireless communication control unit 121 to the PDA 1.

The communication parameter management unit 123 manages the communication parameters, such as the ESSID etc. The key information management unit 124 generates the WEP key to be provided for the PDA 1, etc., which is in proximity. The ESSID managed by the communication parameter management unit 123 and the WEP key managed by the key information management unit 124 are outputted to the encryption processing unit 122, and also to the cable communication control unit 125.

The cable communication control unit 125 manages wired communications with the access points 51, and transmits the ESSID supplied from the communication parameter management unit 123 and the WEP key supplied from the key information management unit 124, to the access point 51 through the cable 111-1.

A cable communication control unit 141 of the access point 51 receives the ESSID and the WEP key which are transmitted from the dummy point 101-1, and outputs them to the wireless communication control unit 71. The network management unit 81 of the wireless communication control unit 71 transmits the ESSID and the WEP key which are transmitted from the dummy point 101-1, to all the devices that have participated in the network wirelessly means so as to update the setup. Further, the network management unit 81 grants the connection from the PDA 1 having acquired the ESSID and the WEP key provided through the dummy point 101-1, and causes the PDA 1 to participate in the network.

Next, referring to a flow chart of FIG. 12, the communication establishment process performed by the PDA 1, the access point 51, and the dummy point 101-1 of FIG. 10A will be described.

By bringing the PDA 1 into proximity to the dummy point 101-1, the process performed between the PDA 1 and the dummy point 101-1 is similar to the processing performed between the PDA 1 and the access points 51 as described with reference to the FIG. 5, FIG. 9, etc.

In other words, in step S181, the input unit 16 of the PDA 1, for example, receives the operation of the connection button performed by the user, with the PDA 1 being in proximity to the dummy point 101-1. In step S182, the key information management unit 34 generates the public key Pk and the secret key Sk corresponding to the public key Pk. The connection request transmission unit 41, in step S183, broadcasts the connection request containing the public key Pk and the communication parameter.

The wireless communication control unit 121 of the dummy point 101-1, in step S161, receives the connection request broadcast from the PDA 1. In step S162, the intensity judgment unit 131 measures the reception intensity of the connection request, then moves the process to step S163 so as to determine whether or not the reception intensity is equal to or higher than the threshold value.

In step S163, if it is determined that the reception intensity of the connection request is lower than the threshold value, the intensity judgment unit 131 terminates the process. On the other hand, if it is determined that the intensity is equal to or higher than the threshold value, the process moves to step S164.

In step S164 the communication parameter management unit 123 of the dummy point 101-1 newly generates an ESSID, and outputs the generated ESSID to the encryption processing unit 122 and the cable communication control unit 125. Further, the key information management unit 124 newly generates a WEP key, and outputs the generated WEP key to the encryption processing unit 122 and the cable communication control unit 125.

In step S165, the encryption processing unit 122 encrypts the ESSID and the WEP key (Z=(the ESSID, the WEP key)) by means of the public key Pk, and outputs the encrypted information data to the wireless communication control unit 121. In step S166, the wireless communication control unit 121 returns the encrypted ESSID and WEP key as the ack (Z) to the PDA 1.

In step S167, the cable communication control unit 125 transmits the ESSID supplied from the communication parameter management unit 123 and the WEP key supplied from the key information management unit 124, to the access point 51 by the cable through the cable 111-1. At this event, the information data other than the ESSID and the WEP key, such as the MAC address of the PDA 1 is also transmitted to the access point 51 and used for the access control in the access point 51.

On the other hand, in step S184, the wireless communication control unit 31 of the PDA 1 receives the ack (Z) returned from the dummy point 101-1. In step S185, the encryption/decryption processing unit 32 decrypts the ack (Z) by using the secret key Sk so as to acquire the ESSID and the WEP key.

In step S186, based on the ESSID and the WEP key acquired by the encryption/decryption processing unit 32, the wireless communication control unit 31 establishes the wireless communications complying with the IEEE 802.11 communications standard and connects to the access point 51. At this event, having received the ESSID and the WEP key transmitted by wire in step S201, the network management unit 81 of the access point 51 moves to a process in step S202, transmits the ESSID and the WEP key wirelessly means to the device which has already participated in the network and updates the setup.

In this way, the infrastructure connection type network is constituted by a group of the devices containing the PDA 1 which is identified by the ESSID newly generated by the dummy point 101-1, and the transmission and reception of the information data through the access point 51 are performed between networks.

According to the above processing, even when the access point 51 is provided in a position to which the PDA 1 cannot directly be brought into proximity, the user can cause the PDA 1 to participate in the network managed by the access point 51, by bringing the PDA 1 into proximity to the dummy point 101-1 etc.

In addition, when the PDA 1 is brought into proximity to the dummy point, the PDA 1 is provided with a URL (Uniform Resource Locator) of a certain site through the dummy point, other than the information data, such as the ESSID and the WEP key. After the PDA 1 is connected to the access point 51 by performing the process of FIG. 12, the PDA 1 may have access to a site specified by the URL through the access point 51.

FIG. 13 is a view showing an example of a structure of the communication system in which the connection to the access point 51 is made by the PDA 1 based on URL provided through the dummy point, and then subsequently the access to the site specified by the URL is carried out.

In FIG. 13, presentation units 151-1 through 151-3 constituted by a display, such as an LCD, a poster, etc., are provided on a wall surface. For example, an advertisement of a camera is presented by the presentation unit 151-1, a map is presented by the presentation unit 151-2, and an advertisement of a personal computer is presented by the presentation unit 151-3.

The dummy points 101-1 through 101-3 connected to the access point 51 through a cable (not shown) are respectively provided directly below the presentation units 151-1 through 151-3. In addition, the access point 51 is provided in the position, above the wall surface, to which it is difficult for the user to bring the PDA 1 into proximity.

In addition to the ESSID and the WEP key for connecting to the access point 51, the dummy point 101-1 provides the PDA 1 with a URL of an advertising site which provides detailed information on the camera presented by the presentation unit 151-1. In addition to the ESSID or the WEP key, the dummy point 101-2 provides the PDA 1 with a URL of a site which provides detailed information on the map presented by the presentation unit 151-2. Further, in addition to the ESSID or the WEP key for connecting to the access point 51, the dummy point 101-3 provides the PDA 1 with a URL of an advertising site which provides detailed information on the personal computer presented by the presentation unit 151-3.

Therefore, for example, as shown in FIG. 13, when the user brings the PDA 1 into proximity to the dummy point 101-1, the connection to the access point 51 is made by the performing the process in FIG. 12 by means of the PDA 1. After that, based on the URL provided from the dummy point 101-1, the access to the advertising site of the camera presented by the presentation unit 151-1 is carried out. When the access to the advertising site of the camera is carried out, the detailed information about the camera is displayed on a screen of the PDA 1. Thus, the user may only bring the PDA 1 into proximity to the advertisement (the dummy point) so as to check the detailed information about an article introduced by the advertisement on the screen of the PDA 1.

In addition, the presentation units 151-1 through 151-3 and the dummy points 101-1 through 101-3 are disposed in different positions in the example of FIG. 13. However, when the presentation units 151-1 through 151-3 are the posters of paper media, the dummy points 101-1 through 101-3 may be provided on the backs respectively. Thus, the user can check the detail of the articles by using the PDA 1 by way of more intuitive operation, such as holding the PDA 1 over the advertisement.

In the above description, in order to establish the communications only between the devices which are actually in proximity to each other, the reception intensity of the reply to the connection request is measured on the PDA 1 side which is the device to broadcast the connection request (for example, FIG. 6). As shown in FIG. 13 and others, based on the reception intensity of each of the connection requests in the dummy points 101-1 through 101-3, the access point 51 may alternatively determine whether or not the PDA 1 is actually in proximity to any of the dummy points, and determine whether or not to grant the connection.

Figure 14A:
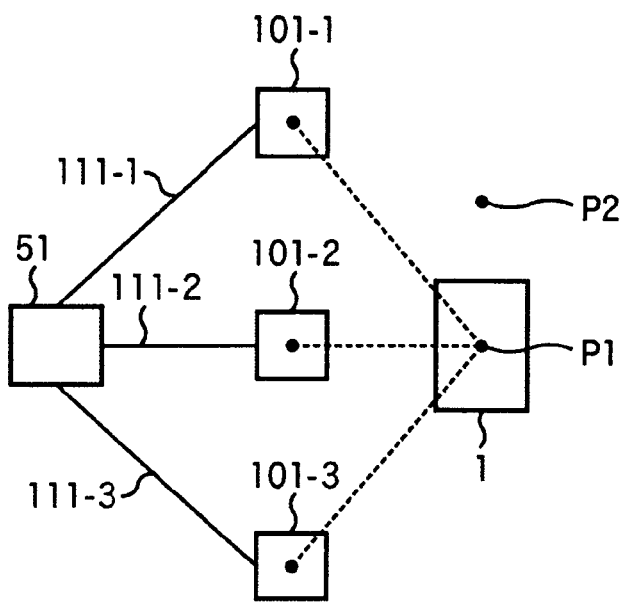
FIGS. 14A and 14B are views showing an example of a spatial relationship between the dummy point and the PDA.
Figure 14B:
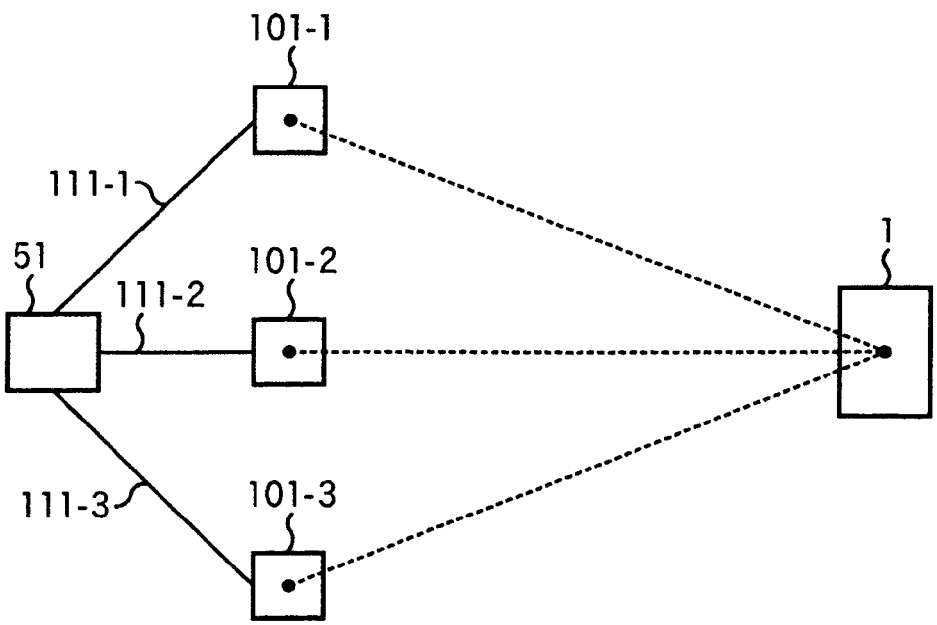

FIGS. 14A and 14B are views showing an example of a spatial relationship among the PDA 1 and the dummy points 101-1 through 101-3.

Having received the connection request broadcast by the PDA 1, the dummy points 101-1 through 101-3 respectively notify the reception intensity to the access point 51 through the cable 111-1 through 111-3.

For example, as shown in FIG. 14A, based on the reception intensity of the connection request received in each of the dummy points 101-1 through 101-3, the access point 51 grants the request from the PDA 1 only when the PDA 1 has judged it is in sufficiently proximity to one dummy point 101-2 as compared with distances to the other two.

Therefore, when the PDA 1 is located in a position P1, since the reception intensity at the dummy point 101-2 is higher than the reception intensities at the dummy point 101-1 and the dummy point 101-3, the access point 51 judges the PDA 1 is in proximity to the dummy point 101-2, and grants the connection from the PDA 1. On the other hand, for example, the PDA 1 is located in the position P2 somewhat above the position P1, and the reception intensities of the connection requests at the dummy point 101-1 and the dummy point 101-2 are measured and result in substantially the same, so that the access point 51 does not allow the connection of the PDA 1.

As described above, it is possible to determine more reliably whether the PDA 1 is in proximity to the dummy point by comparing the reception intensities at respective dummy points. Further, the PDA 1 broadcasting the connection request at a high output level can be prevented from connecting even when not in actual proximity to the dummy point.

For example, as shown in FIG. 14B, when the PDA 1 is not brought into proximity to any of the dummy points, the reception intensities of the connection requests received at the dummy points 101-1 though 101-3 are respectively measured as being of the same level. In this case, the connection of the PDA 1 to the access point 51 is not granted.

When the PDA 1 of FIG. 14B broadcast the connection request at a high output level and the reception intensity of the connection request at each dummy point is not compared, if the reception intensity is equal to or higher than the predetermined threshold value, then the access to the access point 51 is granted. However, it can be prevented by comparing the reception intensities of the connection requests at respective dummy points. That is to say, it is possible to prevent the device which is not in proximity to any of the dummy points from gaining access to the access point 51.

Figure 15:
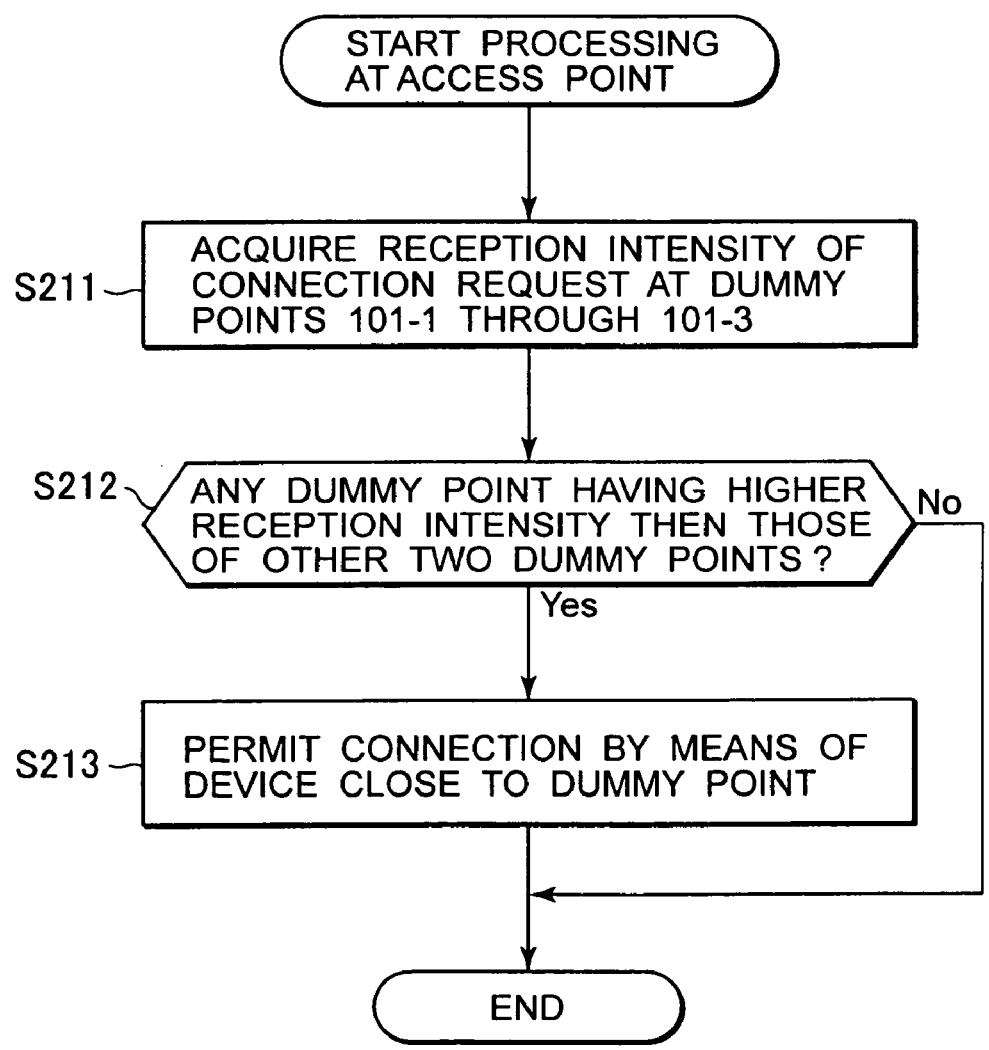
FIG. 15 is a flow chart for explaining a process at the access point.

Referring now to a flow chart of FIG. 15, as described above, based on the reception intensity of the connection request at each dummy point, a process will be described of the access point 51 which determines whether or not to grant the connection.

In step S211, the network management unit 81 (FIG. 11) acquires the reception intensities of the connection requests at the dummy points 101-1 through 101-3, via the cable communication control unit 141.

In step S212, as compared with the other two dummy points, the network management unit 81 determines whether or not there is a dummy point which provides high reception intensity. For example, ratios of the reception intensities of the connection requests in the three dummy points are calculated, and for the highest ratio of them, it is determined whether or not it is higher than the preset threshold value.

When it is determined that there is not such a dummy point in step S212, the network management unit 81 terminates the process. Thus, as shown in FIG. 14B, for example, the connection of a device which is not in proximity to any dummy point is not granted.

On the other hand, when it is determined in step S212 that there is a dummy point which provides high reception intensity as compared with the other two dummy points, the network management unit 81 moves the process to step S213, judges the device is in sufficiently proximity to the dummy point which provides a high reception intensity, and grants the connection of the device. After that, based on the ESSID and the WEP key which are provided through the dummy point, the device granted to be connected is connected with the access point 51.

In the above description, although it has been assumed that the reception intensities of the connection requests at the three dummy points 101-1 through 101-3 are compared, the number of the dummy points is not restricted to three. That is to say, by comparing the reception intensities of the connection requests, any number of dummy points may be provided, if it is possible to determine whether or not a device is in proximity to any of the dummy points.

Figure 16:
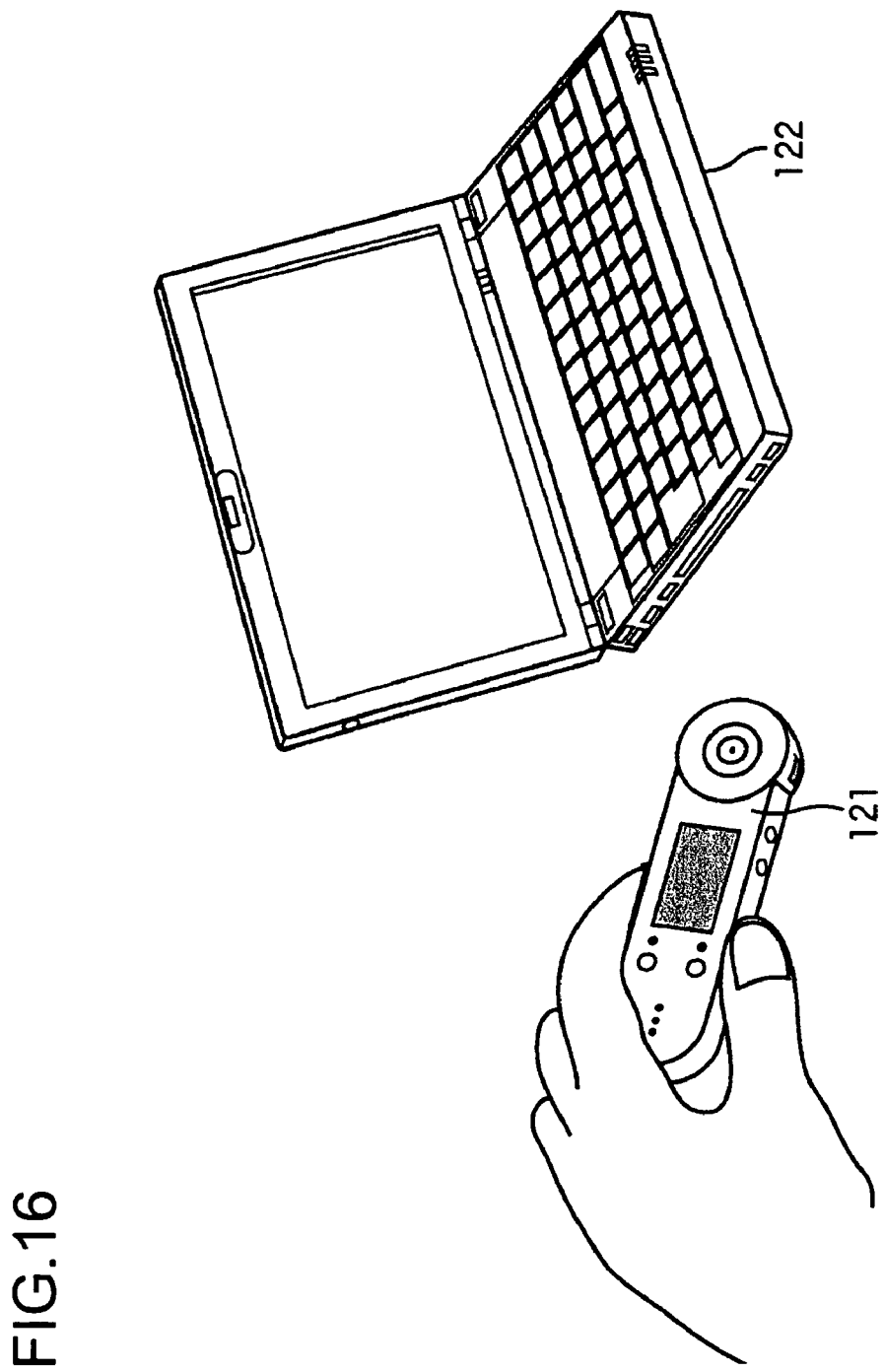
FIG. 16 is a view showing a situation where a portable dummy point and a personal computer are in proximity to each other.

Further, in the above description, although it has been described that the dummy points are provided and fixed to the wall surface, etc., they may be prepared as portable device as shown in FIG. 16, for example.

FIG. 16 is a view showing a situation where a portable dummy point 121 (hereinafter, referred to as the portable dummy point 121) and a personal computer 122 are in proximity to each other.

The portable dummy point 121 is brought into proximity to the personal computer 122. As described above with reference to FIG. 12, when it is determined that the reception intensity of the electromagnetic wave transmitted from the personal computer 122 is higher than the predetermined threshold value, it generates the ESSID and the WEP key, etc., and provides them to the personal computer 122. Further, at this event, the portable dummy point 121 transmits those information data provided for the personal computer 122 also to an access point (not shown), and changes setup of the access point so that access from the personal computer 122 can be granted.

In this way, the personal computer 122 can participate in the network managed by the access point.

The portable dummy point 121, for example, is prepared in a space which provides wireless Internet connection services like Hotspot (a trademark). In this case, for example, an administrator of services owns the portable dummy point 121, and the administrator brings the portable dummy point 121 into proximity to a personal computer of a user having paid service charges, then the portable dummy point 121 is utilized by granting connection to the Internet etc.

Further, in the case where the portable dummy point 121, for example, is prepared for a conference room, etc., each participant at the meeting brings the portable dummy point 121 into proximity to his or her personal computer, and then the portable dummy point 121 is utilized when building a network constituted by the participant's personal computer.

In addition, when transmitting the information data, such as the ESSID and the WEP key, from the portable dummy point 121 to the access point, the transmission may be carried out when the portable dummy point 121 and an access point are in proximity to each other and when the judgment is performed based on the intensity of the received electromagnetic wave as described above, so that the intensity is judged to be equal to or higher than the threshold value. Naturally, the transmission of the information data, such as the ESSID and the WEP key, from the portable dummy point 121 to the access point may be performed by wire through the cable which is connected to the portable dummy point 121, or wirelessly for relatively short distances using a contactless IC tag, infrared rays, etc., whereby, the information data, such as the ESSID and the WEP key, can be prevented from being known to a third party.

A series of processes as described above can be performed by means of hardware and also by way of software.

When a series of processes are performed by way of software, a computer program which constitutes the software is installed, over the network or from the recording medium, in a computer built in dedicated hardware or a general purpose personal computer in which various types of programs are installed so as to execute various types of functions, for example.

As shown in FIG. 2, the recording medium may be not only package media including the magnetic disk 21 (including a flexible disk), the optical disks 22 (including a CD-ROM (Compact Disk-Read Only Memory), a DVD (Digital Versatile Disc)), the magneto-optical disks 23 (including an MD (a registered trademark) (Mini-Disc)), or the semiconductor memory 24 which are apart from the apparatus itself, distributed in order to provide the user with the program and have recorded therein the program, but also the ROM 12 and the storage unit 18 on which the program is recorded and which are provided for the user, being pre-installed in the apparatus itself.

In addition, in the specification, steps which describe the computer program recorded in the recording medium include processes performed in chronological order according to the description but also processes carried out in parallel or individually, even if they are not necessarily processed in chronological order.

Further, in this specification, the word system can be used to mean a whole arrangement constituted by a plurality of apparatuses.

It is therefore to be observed that the present invention is not limited to the above-mentioned examples of preferred embodiments, which are merely descriptions of the present invention in its preferred form under a certain degree of particularity. They are by no means to be construed so as to limiting the scope of the present invention and, accordingly, it is to be understood by those of ordinary skill in the art that many other changes, variations, combinations, sub-combinations and the like are possible therein without departing from the scope and spirit of the present invention.

What is claimed is:

1. A communication system comprising a first information processing apparatus and a second information processing apparatus, wherein:
    the first information processing apparatus comprises:
        a first transmission means for wirelessly broadcasting a connection request containing a public key;
        a first reception means for receiving encrypted key information transmitted wirelessly from a second information processing apparatus in response to the connection request, the encrypted key information being generated by the second information processing apparatus and encrypted using the public key;
        decryption means for decrypting the encrypted key information to obtain a secret key; and
        a first means for conducting encrypted wireless communication with the second information processing apparatus using the secret key received from the second information processing apparatus by the first reception means; and
    the second information processing apparatus comprises:
        a second reception means for receiving the connection request transmitted from the first information processing apparatus;
        a means for generating the secret key only if the reception intensity of the electromagnetic wave which conveys the connection request is higher than a threshold value, the threshold value being greater than a minimum electromagnetic wave reception intensity required for detection of the connection request;
        a second transmission means for transmitting the encrypted key information to the first information processing apparatus;
        a second means for conducting wireless communication encrypted by the secret key with the first information processing apparatus; and further wherein the second information processing apparatus does not send an acknowledge to a received connection request containing the public key if the reception intensity of the electromagnetic wave which conveys the connection request is lower than a threshold value, wherein the analysis of the connection request is determined based upon an electromagnetic wave intensity for electromagnetic energy transferred directly between the first information processing apparatus and the second information processing apparatus, and an ad hoc connection is established only if the electromagnetic wave intensity is greater than the threshold value and the first information processing apparatus and the second information processing apparatus each independently process information in order to present information directly to users of the respective devices.

2. The information processing system according to claim 1, wherein said second transmission means also sends the encrypted key information to all other devices within range that the second information processing apparatus was previously connected to prior to receiving the connection request, the encrypted key information also being used for encrypted communication with all previously connected devices.

3. An information processing apparatus comprising:
    a transmission means for wirelessly broadcasting a connection request containing a public key;
    a reception means for receiving encrypted key information transmitted wirelessly from another information processing apparatus in response to the connection request, the encrypted key information generated by the other information processing apparatus and encrypted using the public key;
    decryption means for decrypting the encrypted key information to obtain a secret key; and
    a means for conducting wireless communication with the other information processing apparatus encrypted by the secret key;
    wherein the conducting means conducts the encrypted wireless communications with the other information processing apparatus only if the reception intensity of the electromagnetic wave which conveys the encrypted key information transmitted from the other information processing apparatus is higher than a threshold value, the threshold value being greater than a minimum electromagnetic wave reception intensity required for detection of the encrypted key information; and further wherein the information processing apparatus does not send an acknowledge to a received connection request containing the public key if the reception intensity of the electromagnetic wave which conveys the connection request is lower than a threshold value, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

4. An information processing method comprising:
    a transmission step for wirelessly broadcasting a connection request from a first information processing apparatus containing a public key;
    a reception step for receiving encrypted key information transmitted wirelessly from a second information processing apparatus in response to the connection request, the encrypted key information generated by the second information processing apparatus and encrypted using the public key;
    a decryption step for decrypting the encrypted key information to obtain a secret key; and
    a step for conducting wireless communication with the other information processing apparatus encrypted by the secret key;
    wherein the conducting step conducts the encrypted wireless communications with the other information processing apparatus only if the reception intensity of the electromagnetic wave which conveys the encrypted key information transmitted from the other information processing apparatus is higher than a threshold value, the threshold value being greater than a minimum electromagnetic wave reception intensity required for detection of the encrypted key information; and further wherein the other information processing apparatus does not send an acknowledge to a received connection request containing the public key if the reception intensity of the electromagnetic wave which conveys the connection request is lower than a threshold value; and maintaining any existing network connections even after receiving a connection request that is below the threshold, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

5. A computer-readable program embodied in a computer readable medium for causing a computer to perform the steps of an information processing method comprising:

a transmission step for wirelessly broadcasting a connection request containing a public key;

a reception step for receiving encrypted key information transmitted wirelessly from another information processing apparatus in response to the connection request, the encrypted key information generated by the other information processing apparatus and encrypted using the public key;

a decryption step for decrypting the encrypted key information to obtain a secret key; and a step for conducting wireless communication with the other information processing apparatus encrypted by the secret key;

wherein the conducting step conducts the encrypted wireless communications with the other information processing apparatus only if the reception intensity of the electromagnetic wave which conveys the encrypted key information transmitted from the other information processing apparatus is higher than a threshold value, the threshold value being greater than a minimum electromagnetic wave reception intensity required for detection of the encrypted key information; and further wherein the other information processing apparatus does not send an acknowledge to a received connection request containing the public key if the reception intensity of the electromagnetic wave which conveys the connection request is lower than a threshold value, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

6. An information processing apparatus comprising:

a reception means for receiving a connection request containing a public key transmitted from another information processing apparatus;

a means for generating a secret key only if a reception intensity of an electromagnetic wave which conveys the connection request is higher than a threshold value, the threshold value being greater than a minimum electromagnetic wave reception intensity required for detection of the connection request;

a transmission means for encrypting the secret key using the public key and transmitting the encrypted key information to the other information processing apparatus; and a means for conducting wireless communication encrypted by the secret key with the other information processing apparatus; and further wherein the other information processing apparatus does not send an acknowledge to a received connection request containing the public key if the reception intensity of the electromagnetic wave which conveys the connection request is lower than a threshold value, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

7. The information processing apparatus according to claim 6, wherein said means for generating a secret key generates a new and different secret key whenever an electromagnetic wave which conveys the connection request has a reception intensity higher than the threshold value and is sent from a device not already connected to the information processing apparatus, the new and different secret key also being used for encrypted communication with all previously connected devices.

8. The information processing apparatus according to claim 6, wherein said transmission means also sends the encrypted key information to all other devices within range that the information processing apparatus was previously connected to prior to receiving the connection request, the encrypted key information also being used for encrypted communication with all previously connected devices.

9. An information processing method comprising:

a reception step for receiving a connection request containing a public key transmitted from another information processing apparatus;

a step for generating a secret key only if a reception intensity of an electromagnetic wave which conveys the connection request is higher than a threshold value, the threshold value being greater than a minimum electromagnetic wave reception intensity required for detection of the connection request;

a transmission step for encrypting the secret key using the public key and transmitting the encrypted key information to the other information processing apparatus;

a step for conducting wireless communication encrypted by the secret key with the other information processing apparatus; and further wherein the information processing apparatus does not send an acknowledge to a received connection request containing the public key if the reception intensity of the electromagnetic wave which conveys the connection request is lower than a threshold value; and maintaining any existing network connections even after receiving a connection request that is below the threshold, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

10. A communication system comprising a first information processing apparatus and a second information processing apparatus, wherein:

the first information processing apparatus comprises:
- a first transmitter for wirelessly broadcasting a connection request containing a public key;
- a first receptor for receiving encrypted key information transmitted wirelessly from a second information processing apparatus in response to the connection request, the encrypted key information being generated by the second information processing apparatus and encrypted using the public key;
- a decryption circuit for decrypting the encrypted key information to obtain a secret key; and
- a first means for conducting encrypted wireless communication with the second information processing apparatus using the secret key received from the second information processing apparatus by the first receptor;

and the second information processing apparatus comprises:
- a second receptor for receiving the connection request transmitted from the first information processing apparatus;
- a generator for generating the secret key only if the reception intensity of the electromagnetic wave which conveys the connection request is higher than a threshold value, the threshold value being greater than a minimum electromagnetic wave reception intensity required for detection of the connection request;
- a second transmitter for encrypting the secret key using the public key and transmitting the encrypted key information to, the first information processing apparatus; and
- a second means for conducting wireless communication encrypted by the secret key with the first information processing apparatus; and further wherein the second information processing apparatus does not send an acknowledge to a received connection request containing the public key if the reception intensity of the electromagnetic wave which conveys the connection request is lower than a threshold value, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

11. An information processing apparatus comprising:
- a transmitter for wirelessly broadcasting a connection request containing a public key;
- a receptor for receiving encrypted key information transmitted wirelessly from another information processing apparatus in response to the connection request, the encrypted key information generated by the other information processing apparatus and encrypted using the public key;
- a decryption circuit for decrypting the encrypted key information to obtain a secret key; and
- a means for conducting wireless communication with the other information processing apparatus encrypted by the secret key;

wherein the conducting means conducts the encrypted wireless communications with the other information processing apparatus only if the reception intensity of the electromagnetic wave which conveys the encrypted key information transmitted from the other information processing apparatus is higher than a threshold value, the threshold value being greater than a minimum electromagnetic wave reception intensity required for detection of the encrypted key information; and further wherein the information processing apparatus does not send an acknowledge to a received connection request containing the public key if the reception intensity of the electromagnetic wave which conveys the connection request is lower than a threshold value; and maintaining any existing network connections even after receiving a connection request that is below the threshold, wherein the analysis of the connection request is determined based upon an electromagnetic wave intensity for electromagnetic energy transferred directly between a first information processing apparatus and a second information processing apparatus, and an ad hoc connection is established only if the electromagnetic wave intensity is greater than the threshold value and the first information processing apparatus and the second information processing apparatus each independently process information in order to present information directly to users of the respective devices.

* * * * *